(12) United States Patent
Miyake et al.

(10) Patent No.: US 11,696,051 B2
(45) Date of Patent: Jul. 4, 2023

(54) IMAGING DEVICE

(71) Applicant: Panasonic Intellectual Property Management Co., Ltd., Osaka (JP)

(72) Inventors: Yasuo Miyake, Osaka (JP); Sanshiro Shishido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 17/539,338

(22) Filed: Dec. 1, 2021

(65) Prior Publication Data

US 2022/0094873 A1 Mar. 24, 2022

Related U.S. Application Data

(63) Continuation of application No. PCT/JP2020/024749, filed on Jun. 24, 2020.

(30) Foreign Application Priority Data

Aug. 1, 2019 (JP) .................................. 2019-142102

(51) Int. Cl.
*H04N 25/71* (2023.01)
*H04N 25/75* (2023.01)
(Continued)

(52) U.S. Cl.
CPC ............. *H04N 25/75* (2023.01); *H04N 25/65* (2023.01); *H04N 25/771* (2023.01); *H04N 25/772* (2023.01)

(58) Field of Classification Search
None
See application file for complete search history.

(56) References Cited

U.S. PATENT DOCUMENTS

2008/0018760 A1 1/2008 Nakajima
2008/0122933 A1 5/2008 Murayama
(Continued)

FOREIGN PATENT DOCUMENTS

JP 2004-241818 8/2004
JP 2008-008700 1/2008
(Continued)

OTHER PUBLICATIONS

International Search Report of PCT application No. PCT/JP2020/024749 dated Sep. 24, 2020.

*Primary Examiner* — Mark T Monk
(74) *Attorney, Agent, or Firm* — McDermott Will & Emery LLP

(57) ABSTRACT

In an imaging device, a first digital signal corresponding to a first analog signal read out from a pixel, and a second digital signal corresponding to the amount of charge accumulated during a first exposure period following a period for reading the first analog signal. A difference is acquired between a first difference and a second difference wherein the first difference is a difference between a third digital signal and the second digital signal, the third digital signal is a digital signal corresponding to the amount of charge cumulatively accumulated during the first exposure period and a following second exposure period, and the second difference is a difference between the second digital signal and the first digital signal. At least one of the first exposure period or the second exposure period includes a period during which the first light source is in the on-state.

5 Claims, 15 Drawing Sheets

(51) Int. Cl.
*H04N 25/65* (2023.01)
*H04N 25/771* (2023.01)
*H04N 25/772* (2023.01)

(56) References Cited

U.S. PATENT DOCUMENTS

| | | | |
|---|---|---|---|
| 2011/0241151 | A1 | 10/2011 | Nakatani et al. |
| 2014/0293085 | A1* | 10/2014 | Hashimoto ............ H04N 23/76 348/222.1 |
| 2018/0010903 | A1 | 1/2018 | Takao et al. |
| 2018/0098009 | A1 | 4/2018 | Furuta |
| 2020/0322556 | A1 | 10/2020 | Tokuhara et al. |

FOREIGN PATENT DOCUMENTS

| | | |
|---|---|---|
| JP | 2008-028517 | 2/2008 |
| JP | 2011-228648 | 11/2011 |
| JP | 2018-533870 | 11/2018 |
| WO | 2016/157593 | 10/2016 |
| WO | 2016/185701 | 11/2016 |
| WO | 2017/065949 | 4/2017 |
| WO | 2019/131028 | 7/2019 |

\* cited by examiner

IMAGING DEVICE

BACKGROUND

1. Technical Field

The present disclosure relates to an imaging device.

2. Description of the Related Art

Japanese Unexamined Patent Application Publication No. 2011-228648 (hereinafter, for simplicity, referred to as PTL 1) discloses an imaging device having an organic photoelectric conversion layer supported on a semiconductor substrate via an insulating layer. A configuration in which a photoelectric converter having a plurality of pixel electrodes is disposed above a semiconductor substrate instead of an embedded photodiode as described PTL 1 is called a "stacked type". In such a configuration, the semiconductor substrate supporting the photoelectric converter has a plurality of readout circuits corresponding to respective pixels each having a pixel electrode. As described in FIG. 1 of PTL 1, the pixel electrode of each pixel is connected to a corresponding one of the readout circuits through a via formed in the insulating layer.

The imaging device can be used not only for acquiring a still image or a moving image of a person, a scene, or the like, but also can be used for acquiring information in terms of intensity of reflected light for calculating a distance to a subject located in front of the imaging device. For example, International Publication No. 2016/157593 discloses a technique for acquiring a distance image indicating a distance to a subject by irradiating the subject with a two-dimensional light pattern and capturing an image of the subject.

In the field of imaging devices, there is a demand for noise reduction. In particular, there is a demand for reducing kTC noise which is generated when a charge generated by a photoelectric conversion is reset. The kTC noise is also called reset noise. Japanese Unexamined Patent Application Publication No. 2008-028517 discloses a technique in which data of a reset level is stored in a frame memory, and a difference between a signal level and the reset level is acquired. In this technique, the reset level is subtracted from the signal level via digital processing thereby cancelling an influence of shot noise caused by a dark current generated in memory means in each pixel.

SUMMARY

In a so-called stacked configuration, a pixel electrode and a readout circuit on a semiconductor substrate are electrically connected through a via which is typically formed of metal. In this configuration, it is fundamentally difficult to completely transfer a signal charge to the readout circuit by providing a structure using an impurity region or the like in the semiconductor substrate for temporarily accumulating the signal charge and transferring the accumulated signal charge to the readout circuit via a transistor as disclosed, for example, in Japanese Unexamined Patent Application Publication No. 2008-028517 (hereafter for simplicity referred to PTL 3). That is, it is difficult to simply apply a noise cancellation technique conventionally used for an imaging device having an embedded photodiode such as that described PTL 3. In particular, in ranging, random noise typified by the reset noise may cause a reduction in accuracy of a calculated distance.

In one general aspect, the techniques disclosed here feature an imaging device including a plurality of pixels each of which includes a charge accumulation region and a readout circuit and accumulates a charge depending on an amount of exposure, a first frame memory, a second frame memory, an image processing circuit, and a first light source that emits infrared light having a peak at a first wavelength, wherein the first frame memory temporarily stores a first digital signal corresponding to a first analog signal read through the readout circuit, the second frame memory temporarily stores a second digital signal corresponding to a second analog signal depending on an amount of charge accumulated in the pixel during a first exposure period following a reading period in which the first analog signal is read out, the image processing circuit outputs a difference between a first difference and a second difference, the first difference being a difference between a third digital signal and the second digital signal, the third digital signal corresponding to a third analog signal corresponding to an amount of charge cumulatively accumulated in the pixel during the first exposure period and a second exposure period following the first exposure period, the second difference being a difference between the second digital signal and the first digital signal, and at least one of the first exposure period or the second exposure period includes a period for which the first light source is in an on-state.

General or specific embodiments may be implemented by a component, a device, a system, an integrated circuit, a method, or a computer program. Furthermore, the general or specific embodiments may be realized by any combination of a component, a device, an apparatus, a system, an integrated circuit, a method, and a computer program.

According to an embodiment of the present disclosure, it is possible to realize an imaging device capable of obtaining an image based on light with a specific wavelength in a form in which reset noise is suppressed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
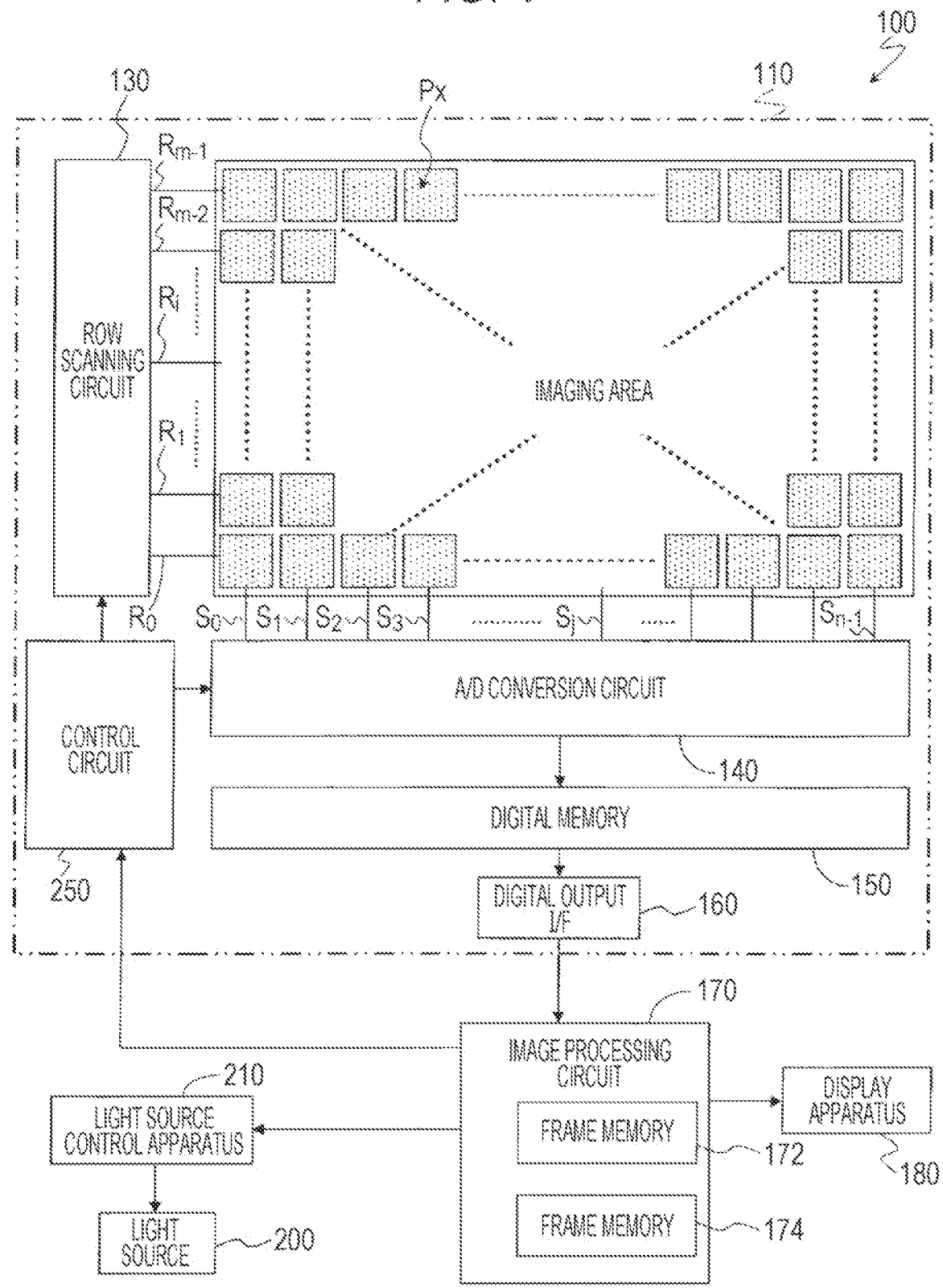
FIG. 1 a diagram schematically illustrating an example of a configuration of an imaging device according to an embodiment of the present disclosure.

An overview of aspects of the present disclosure is described below.

Aspect 1: An imaging device according to Aspect 1 includes a plurality of pixels each of which includes a charge accumulation region and a readout circuit and accumulates a charge depending on an amount of exposure, a first frame memory, a second frame memory, an image processing circuit, and a first light source that emits infrared light having a peak at a first wavelength, wherein the first frame memory temporarily stores a first digital signal corresponding to a first analog signal read through the readout circuit, the second frame memory temporarily stores a second digital signal corresponding to a second analog signal depending on the amount of charge accumulated in the pixel during a first exposure period following a reading period in which the first analog signal is read out, the image processing circuit outputs a difference between a first difference and a second difference, the first difference being a difference between a third digital signal and the second digital signal, the third digital signal corresponding to a third analog signal corresponding to an amount of charge cumulatively accumulated in the pixel during the first exposure period and a second exposure period following the first exposure period, the second difference being a difference between the second digital signal and the first digital signal, and at least one of the first exposure period or the second exposure period includes a period for which the first light source is in an on-state.

According to Aspect 1, it is possible to obtain an image based on specific light with which a subject is intentionally irradiated during one exposure period such that the influence of charge generated by photoelectric conversion of, for example, ambient light is substantially cancelled while canceling random noise.

Aspect 2: In the imaging device according to Aspect 2 based on Aspect 1, the first analog signal is a reset signal representing a reset level of the pixel.

Aspect 3: In the imaging device according to Aspect 3 based on Aspect 1 or 2, the first light source is set to be in the on-state during the second exposure period of the first exposure period and the second exposure period.

According to Aspect 3, the digital signal or pixel value that substantially represents an image obtained by shooting performed under only the light emitted from the first light source is obtained in a form in which the influence of the reset noise is cancelled.

Aspect 4: The imaging device according to Aspect 4 based on Aspect 3 further includes a second light source that emits light having a peak at a second wavelength different from the first wavelength, wherein the first exposure period includes a period during which the second light source is set to be in the on-state.

Aspect 5: In the imaging device according Aspect 5 based on one of Aspects 1 to 4, each pixel includes a semiconductor substrate on which the readout circuit is disposed, and a photoelectric converter which is located above the semiconductor substrate and is electrically connected to the readout circuit.

Embodiments of the present disclosure are described below in detail with reference to the drawings. Note that any of the embodiments described below illustrate a general or a specific example. In the following embodiments of the present disclosure, values, shapes, materials, constituent elements, locations of the constituent elements and manners of connecting the constituent elements, steps, the order of steps, and the like are described by way of example but not limitation. Various aspects described herein can be combined with each other as long as there is no conflict. Among constituent elements described in the following embodiments, those constituent elements that are not described in independent claims indicating highest-level concepts of the present disclosure are optional. In the following description, constituent elements having substantially the same function are denoted by common reference numerals, and a duplicated description thereof may be omitted. Some constituent elements may be omitted in figures in order to avoid overly complicated drawings.

Embodiments of Imaging Device

FIG. 1 schematically illustrates an example of a configuration of an imaging device according to an embodiment of the present disclosure. The imaging device 100 shown in FIG. 1 includes a plurality of pixels Px each having, as one of its elements, a photoelectric converter supported on a semiconductor substrate 110. That is, the imaging device 100 according to this embodiment of the present disclosure is formed by way of example in a so-called stacked configuration.

The plurality of pixels Px are arranged, for example, in a two-dimensional array on the semiconductor substrate 110 thereby forming an imaging region. The number and arrangement of pixels Px are not limited to those shown in FIG. 1, but the number and arrangement of pixels Px are arbitrary. For example, a plurality of pixel Px may be one-dimensionally arranged thereby realizing the imaging device 100 functioning as a line sensor. As will be described in detail below with reference to the drawings, the semiconductor substrate 110 has a plurality of readout circuits each formed corresponding to one pixel Px.

The imaging device 100 includes a plurality of row signal lines $R_i$ and a plurality of output signal lines $S_j$. In FIG. 1, a plurality of pixels Px are arranged in an array with m rows and n columns, and the plurality of row signal lines $R_i$ include m row signal lines $R_i$ (i=0, 1, 2, ..., m−2, m−1) arranged corresponding to respective rows of pixels Px. Similarly, the plurality of output signal lines $S_j$ include n output signal lines $S_j$ (j=0, 1, 2, ..., n−2, n−1) arranged corresponding to respective columns of pixels Px. Note that m and n each take independently an integer equal to or greater than of 1.

Each of the row signal lines $R_i$ is electrically connected to one or more pixels Px belonging to the same row. These row signal lines $R_i$ are connected to a row scanning circuit 130. Note that two or more signal lines may be provided for each row of pixels Px. Similarly, each of the output signal lines $S_j$ is electrically connected to readout circuits of one or more pixels Px belonging to the same column. The plurality of output signal lines $S_j$ are connected to an analog-to-digital conversion circuit 140 and further to a digital output interface 160. The digital output interface 160 outputs signals read from readout circuits of pixels Px in each column. Hereinafter, for simplicity, the analog-to-digital conversion circuit 140 will be referred to simply as the "A/D conversion circuit 140", and the digital output interface 160 will be referred to simply as the "interface 160".

As shown in FIG. 1, the imaging device 100 further includes a digital memory 150 connected between the A/D conversion circuit 140 and the interface 160. The digital memory 150 temporarily stores signals read from a plurality of pixels Px of one row. By interposing the digital memory 150 between the A/D conversion circuit 140 and the interface 160, it becomes possible to output the digital signals in units of rows at a higher speed.

The interface is connected to an image processing circuit 170. The image processing circuit 170 performs processes such as a gamma correction, a color interpolation process, a spatial interpolation process, an auto white balance process on the digital signal output from the interface 160 as necessary. The image processing circuit 170 may be implemented, for example, by a digital signal processor (DSP), an image signal processor (ISP), a field-programmable gate array (FPGA), or the like. In the configuration illustrated by way of example in FIG. 1, the imaging device 100 further includes a display device 180, such as a liquid crystal display or an organic EL display, connected to the image processing circuit 170. The display device 180 displays an image based on a digital signal obtained by imaging a subject thereby presenting the image to a user of the imaging device 100.

In the configuration illustrated by way of example in FIG. 1, the image processing circuit 170 includes a first frame memory 172 and a second frame memory 174. Each of the first frame memory 172 and the second frame memory 174 temporarily stores digital data corresponding to one frame output from the interface 160. Note that the first frame memory 172 and the second frame memory 174 each store digital data of one frame such that frames stored therein are different between the first and second frame memories. As described later, the image processing circuit 170 executes a process of determining a difference between the digital signal stored in the first frame memory 172 and the digital signal stored in the second frame memory 174.

In this example, the imaging device 100 further includes a light source 200. In an exemplary embodiment of the present disclosure, the light source 200 is an infrared light source that emits infrared light. An infrared laser may be used as the light source 200. In particular, a light source called an eye-safe later, which emits light in a wavelength range of about 1.4 micrometers, may be advantageously used for the light source 200. In this specification, for convenience, general electromagnetic waves including infrared light and ultraviolet light may be referred to as "light".

Turning on/off of the light source 200 is controlled by a light source control apparatus 210. The image processing circuit 170 receives, for example, command data, and a clock, or the like from the outside of the imaging device 100, and supplies a light emission timing signal, synchronized with the reading of a signal from the pixel Px, to the light source control apparatus 210. That is, in the embodiment of the present disclosure, the light source 200 is configured to operate in synchronization with reading signals from a plurality of pixels Px. The light source control apparatus 210 includes a switching element which is turned on/off according to the light emission timing signal supplied from the image processing circuit 170.

In this example, a control circuit 250 is electrically connected to the image processing circuit 170. The image processing circuit 170 provides control signals such as a vertical synchronization signal and a horizontal synchronization signal to the control circuit 250. The row scanning circuit 130 and the A/D conversion circuit 140 are connected to the control circuit 250. The control circuit 250 controls the entire imaging device 100. The control circuit 250 may be implemented, for example, by a microcontroller including one or more processors, and typically includes a timing generator. The control circuit 250 supplies drive signals to the row scanning circuit 130 and the A/D conversion circuit 140. In FIG. 1, an arrow extending toward the control circuit 250 and arrows extending from the control circuit 250 schematically represent an input signal to the control circuit 250 and output signals from the control circuit 250, respectively. The control circuit 250 may include one or more memories.

As will be described in detail later with reference to drawings, in a typical embodiment of the present disclosure, a difference between a first digital signal output from interface 160 and a second digital signal representing an image for a frame period that includes a first exposure period as a part thereof is calculated via digital processing, where the first digital signal is, for example, a digital signal corresponding to a reset signal read from each pixel after a reset operation performed before the start of the first exposure period. The first digital signal includes reset noise, and pixel exposure is performed following reading of the reset signal, and thus the second digital signal also includes reset noise similar to that included in the first digital signal. Thus, the difference between the first and second digital signals substantially does not include reset noise.

In the typical embodiment of the present disclosure, furthermore, a difference between a third digital signal and the second digital signal is calculated via digital processing, where the third digital signal represents an image for a frame period following the above-described frame period and includes a second exposure period as a part thereof. Note that the reset operation of the pixel Px is not performed between the two adjacent frame periods described above. Therefore, signals read out from the respective pixels in a reading period in a subsequent frame period are signals corresponding to the total amount of charge cumulatively accumulated during the first exposure period and the second exposure period. The third digital signal also includes reset noise as with the second digital signal. The influence of the reset noise is substantially canceled by taking a difference between the third digital signal and the second digital signal.

One of the first exposure period or the second exposure period includes a period for which the light source 200 is in the on-state, and the light source 200 is in the off-state for the other of the first and second exposure periods. That is, one of the second digital signal or the third digital signal is a signal based on light reflected from a subject under ambient light such as sunlight or light from a luminaire, and the other is a signal based on light reflected from the subject under the condition in which infrared light or the like is intentionally superimposed on the ambient light. Therefore, as will be described in further detail later, by further calculating the first difference and the second difference where the first difference is a difference between the first digital signal and the second digital signal, and the second difference is a difference between the second digital signal and the third digital signal, it is possible to obtain image data substantially based on reflected light from the subject wherein the reflected light originates from light which is emitted from the light source to intentionally strike the subject during one of the exposure periods. Note that the influence of the reset noise is substantially eliminated in the difference between the first difference and the second difference. That is, according to the embodiment of the present disclosure, it is possible to obtain an image based on specific light which is emitted so as to intentionally strike the subject during one of the exposure periods in a form in which random noise and an effect of a charge generated by photoelectric conversion of ambient light are both cancelled.

Example of Circuit Configuration of Pixel Px

Figure 2:
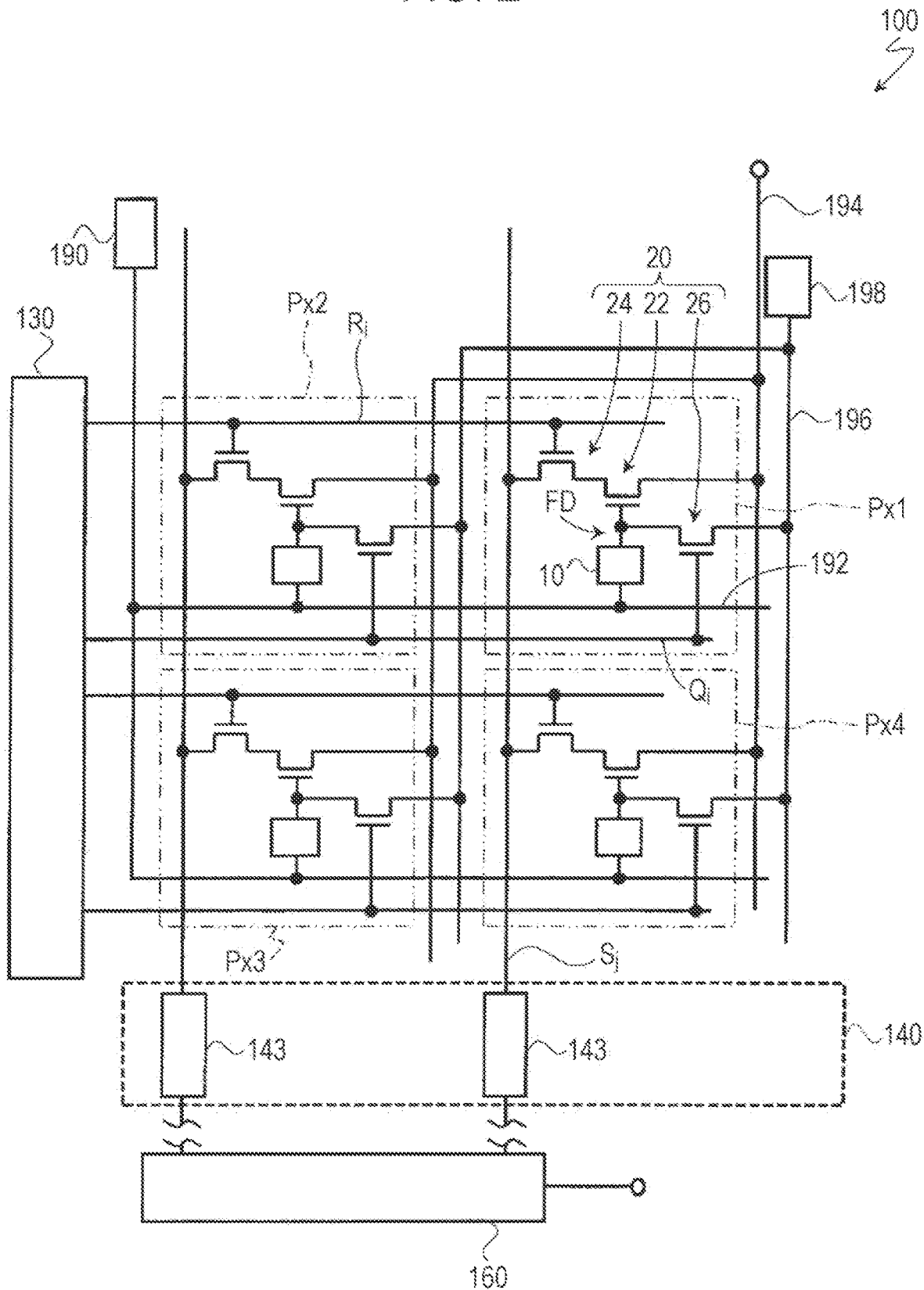
FIG. 2 is a diagram schematically illustrating an example of a circuit configuration of an imaging device according to an embodiment of the present disclosure.

FIG. 2 illustrates an example of a circuit configuration of the imaging device 100. For the sake of simplicity, FIG. 2 schematically shows four pixels Px included in the imaging region shown in FIG. 1. These four pixels Px include a first pixel Px1, a second pixel Px2, a third pixel Px3, and a fourth pixel Px4 arranged in an array of two rows and two columns. Of these pixels, the first pixel Px1 and the second pixel Px2 are located in one row, while the third pixel Px3 and the fourth pixel Px4 are located in another row different from the row in which the first pixel Px1 and the second pixel Px2 are located. The basic circuit configuration of the pixels is common for these pixels Px1 to Px4, and thus, an example of a configuration of a pixel is described below with reference to the first pixel Px1.

The first pixel Px includes a photoelectric converter 10 and a readout circuit 20 electrically connected to the photoelectric converter 10. As will be described later, the photoelectric converter 10 includes a pixel electrode, a counter electrode, and a photoelectric conversion layer disposed between these electrodes. The photoelectric converter 10 of each pixel includes an electrical connection with a voltage line 192 connected to a voltage supply circuit 190, thereby allowing it to apply a particular voltage between the pixel electrode and the counter electrode in an operation of the imaging device 100. The voltage supply circuit 190 is not limited to a particular power supply circuit as long as the particular voltage can be applied to the photoelectric converter 10 of each pixel in the operation of the imaging device 100. The voltage supply circuit 190 may be a circuit that generates the particular voltage, or a circuit that converts a voltage supplied from another power supply to the particular voltage. The voltage supply circuit 190 may be a part of the row scanning circuit 130.

In the example of the configuration illustrated in FIG. 2, the readout circuit 20 includes a signal detection transistor 22, an address transistor 24, and a reset transistor 26. The signal detection transistor 22, the address transistor 24, and the reset transistor 26 are each typically a field effect transistors formed on the semiconductor substrate 110. The following description is given, by way of example, for a case where N-channel MOSFETs are used for these transistors.

A gate of the signal detection transistor 22 is connected to the pixel electrode of the photoelectric converter 10. A source of the signal detection transistor 22 is connected to a corresponding output signal line $S_j$ via the address transistor 24. The first pixel Px1 and the fourth pixel Px4 belong to the same column, and the sources of the signal detection transistors 22 included in the readout circuits 20 of these pixels are both electrically connected to the same output signal line $S_j$. As schematically shown in FIG. 2, the A/D conversion circuit 140 may include a plurality of elements such as column signal processing circuits 143 each of which is provided for corresponding one of output signal lines $S_j$. Each of the elements is connected to a corresponding one of the output signal lines. On the other hand, a drain of the signal detection transistor 22 is connected to a power supply line 194. The power supply line 194 functions as a source-follower power supply when a power supply voltage VDD of about 3.3 V is applied in operation of the imaging device 100.

A row signal line $R_i$ is connected to the gate of the address transistor 24. The row scanning circuit 130 switches the state of the address transistor 24 between the on-state and the off-state by controlling the voltage level applied to the row signal line $R_i$. By performing this switching operation, the row scanning circuit 130 can read signals from the pixels Px belonging to the selected row to the corresponding output signal line.

In this example, the readout circuit 20 includes a reset transistor 26. One of the drain or the source of the reset transistor 26 is connected to a node FD via which the photoelectric converter 10 is electrically connected to the gate of the signal detection transistor 22. The other of the drain and the source of the reset transistor 26 is connected to a reset voltage line 196. The reset voltage line 196 is connected to a reset voltage supply circuit 198. In operation of the imaging device 100, a particular reset voltage $V_{RST}$ is applied from the reset voltage supply circuit 198 to the reset voltage line 196. As the reset voltage $V_{RST}$, for example, a voltage of 0 V or a voltage about 0 V is used. The reset voltage supply circuit 198, as with the voltage supply circuit 190, is not limited to a particular power supply circuit as long as it is capable of applying the particular reset voltage to each pixel in operation of the imaging device 100. The reset voltage supply circuit 198 may be a circuit independent of the voltage supply circuit 190. One of the reset voltage supply circuit 198 or the voltage supply circuit 190 may be a part of the other.

A plurality of reset signal lines $Q_i$ are provided corresponding to a plurality of pixels Pw. As shown in FIG. 2, typically, one reset signal line $Q_i$ is connected in common to gates of reset transistors 26 of pixels Px belonging to one same row. In this example, each reset signal line $Q_i$ has a connection with the row scanning circuit 130. Therefore, by controlling the voltage level applied to the reset signal lines $Q_i$, the row scanning circuit 130 can turn on a plurality of reset transistors Px 26 at a time on a row by row basis thereby resetting, to $V_{RST}$, the voltage of the nodes FD of the pixels Px whose reset transistors 26 are turned on.

Device Structure of Pixel Px

Figure 3:
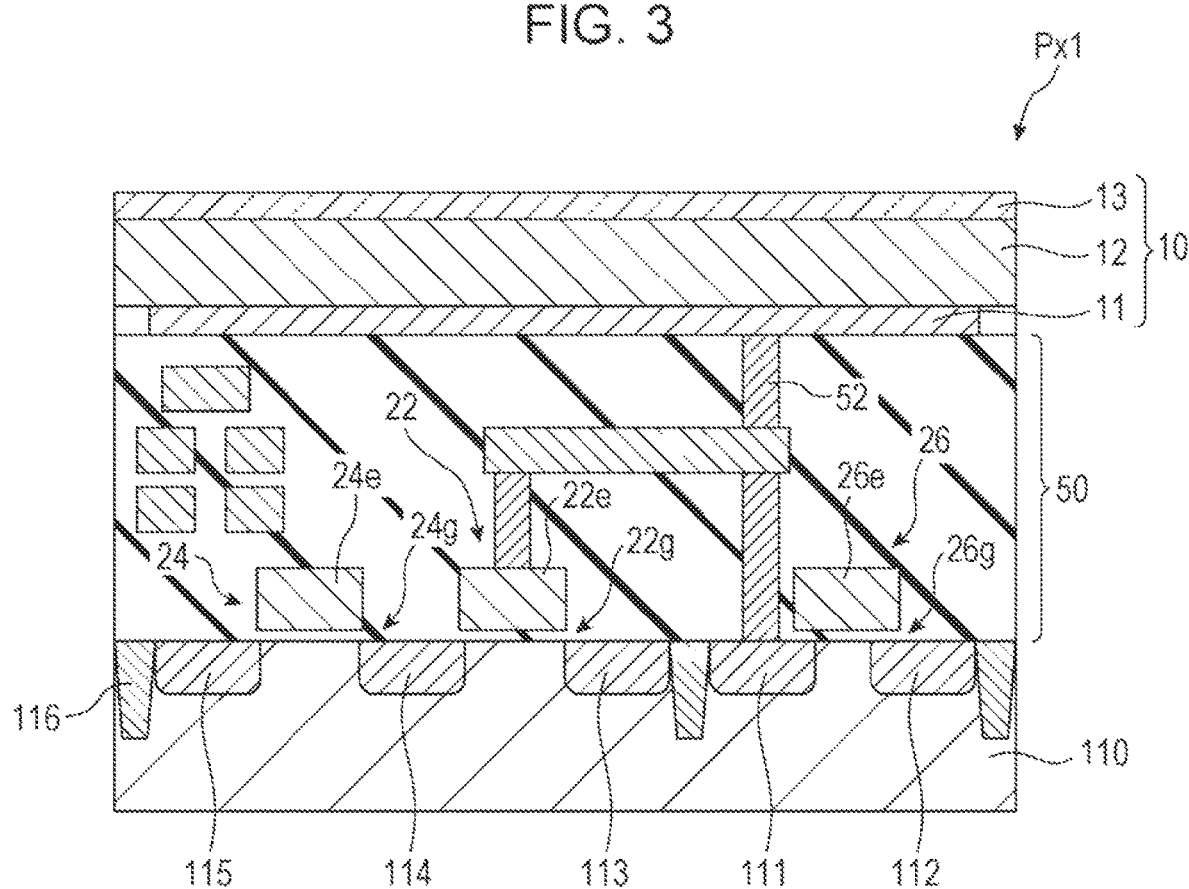
FIG. 3 is a cross-sectional view schematically illustrating an example of device structure of a first pixel.

FIG. 3 schematically illustrates a device structure of the first pixel Px1. The first pixel Px1 includes mainly the semiconductor substrate 110 on which the readout circuit 20 is formed, and the photoelectric converter 10 supported on the semiconductor substrate 110. As shown in FIG. 3, typically, an insulating layer 50 covering the readout circuit 20 is disposed between the semiconductor substrate 110 and the photoelectric converter 10.

The photoelectric converter 10 includes a pixel electrode 11 supported on the insulating layer 50, a translucent counter electrode 13, and a photoelectric conversion layer 12 disposed between the pixel electrode 11 and the counter electrode 13. The pixel electrode 11 is located closer to the semiconductor substrate 110 than to the photoelectric conversion layer 12. The pixel electrode 11 may be formed of a metal such as aluminum or copper, a metal nitride, or polysilicon doped with impurities so as to be conductive. As shown in FIG. 3, the pixel electrode 11 is spatially separated from other pixel electrodes 11 of other adjacent pixels, thereby being electrically separated from them.

The counter electrode 13 is located on a side where light from the subject is incident. The counter electrode 13 is a translucent electrode formed of a conductive material such as ITO. Note the term "translucent" is used in this specification to indicate that the counter electrode 13 is capable of transmitting light with at least a part of the wavelengths that can be absorbed by the photoelectric conversion layer 12, and it is not essential that light is transmitted over the entire visible wavelength range. On a principal surface of the counter electrode 13 opposite to the photoelectric conversion layer 12, an optical filter such as a color filter, a microlens, or the like may be disposed.

The counter electrode 13 is typically provided in the form of a single electrode layer continuous across a plurality of pixels. The voltage line 192 described above is connected to the counter electrode 13 of the photoelectric converter 10. FIG. 2 indicates that one voltage line 192 is connected to photoelectric converters 10 of each group of pixels. However, typically, the counter electrode 13 of each pixel is part of the single translucent electrode that is continuous over the plurality of pixels, and therefore, the counter electrode 13 of the pixels is basically equipotential, and thus it is not essential that the voltage line 192 is branched into a plurality of lines.

The photoelectric conversion layer 12 is formed of an organic material or an inorganic material such as amorphous silicon such that the photoelectric conversion layer 12 generates a pair of charges in response to receiving incident light transmitted through the counter electrode 13. Like the counter electrode 13, the photoelectric conversion layer 12 is typically provided in the form of a single photoelectric conversion structure that is continuous over a plurality of pixels. That is, the photoelectric conversion layer 12 in each pixel may be part of the photoelectric conversion layer that is continuously formed over the plurality of pixels.

By forming the photoelectric conversion layer 12 with a photoelectric conversion material containing one or more suitable materials, it becomes possible to achieve the photoelectric conversion layer 12 which is sensitive, for example, to both visible light region and infrared light. Examples of such materials are described in detail, for example, in International Publication No. 2018/025544. The entire disclosure of International Publication No. 2018/025544 is incorporated herein by reference. The photoelectric conversion layer 12 may be formed by quantum dots and/or nanotubes. Alternatively, the photoelectric conversion layer 12 may include quantum dots and/or nanotubes functioning as a photoelectric conversion material. The photoelectric conversion layer 12 may include a layer formed of an organic material and a layer formed of an inorganic material.

The insulating layer 50 located between the semiconductor substrate 110 and the photoelectric converter 10 includes a plurality of insulating layers each formed of, for example, silicon dioxide. As schematically shown in FIG. 3, a multilayer wiring including at least a conductive structure 52 whose one end is connected to the pixel electrode 11 of the photoelectric converter 10 is provided inside the insulating layer 50. The conductive structure 52 may include a via and wiring formed of a metal such as copper, a plug formed of polysilicon, and the like. In the example illustrated, the other end of the conductive structure 52 is electrically connected to an impurity region 111 formed in the semiconductor substrate 110.

The semiconductor substrate 110 includes, in addition to the impurity region 111, impurity regions 112, 113, 114, and 115. The semiconductor substrate 110 further includes an element isolation region 116 for electrically isolating the readout circuits 20 provided for the respective pixels Px between the pixels Px. In the following description, a P-type silicon substrate is used by way of example as the semiconductor substrate 110. The semiconductor substrate 110 may be an insulating substrate on which a semiconductor layer is provided.

Each of the impurity regions 111, 112, 113, 114 and 115 is typically an N-type diffusion region. Among these impurity regions, the impurity region 111 is connected to the conductive structure 52 and functions as one of the source region and the drain region of the reset transistor 26. The reset transistor 26 further includes an impurity region 112 functioning as the other of the source region and the drain region, a gate insulating layer 26g on the semiconductor substrate 110, and a gate electrode 26e on the gate insulating layer 26g. Although not shown in FIG. 3, the above-described reset voltage line 196 is connected to the impurity region 112.

The signal detection transistor 22 includes an impurity region 113 and an impurity region 114, a gate insulating layer 22g on the semiconductor substrate 110, and a gate electrode 22e on the gate insulating layer 22g. The impurity region 113 functions as a drain region of the signal detection transistor 22, and the impurity region 114 functions as a source region of the signal detection transistor 22. The impurity region 113 is connected to the power supply line 194 described above. As schematically shown in FIG. 3, an element isolation region 116 is also provided between the signal detection transistor 22 and the reset transistor 26.

The address transistor 24 includes an impurity region 114 and an impurity region 115, a gate insulating layer 24g on the semiconductor substrate 110, and a gate electrode 24e on the gate insulating layer 24g. The impurity regions 114 and 115 respectively function as a drain region and a source region of the address transistor 24. In the configuration illustrated by way of example in FIG. 3, the address transistor 24 shares the impurity region 114 with the signal detection transistor 22. The impurity region 115 is connected to corresponding one of the plurality of output signal lines $S_j$.

The insulating layer 50 covers the signal detection transistor 22, the address transistor 24, and the reset transistor 26. As schematically shown in FIG. 3, the conductive structure 52 in the insulating layer 50 also has an electrical connection with the gate electrode 22e of the signal detection transistor 22. That is, the conductive structure 52 in each pixel has a function of electrically connecting the pixel electrode 11 of the photoelectric converter unit 10 to the readout circuit 20 including the signal detection transistor 22 etc. formed on the semiconductor substrate 110.

The conductive structure 52 also functions as part of a charge accumulation region that temporarily accumulates the charge collected by the pixel electrode 11, that is, the signal charge. As described above with reference to FIG. 2, the voltage supply circuit 190 applies a particular voltage to the photoelectric converter 10 of each pixel via the voltage line 192. For example, by applying a voltage to the counter electrode 13 of the photoelectric converter 10, a particular voltage difference ΔV can be applied between the counter electrode 13 and the pixel electrode 11 for the exposure period. For example, by applying a voltage to the counter electrode 11 such that the potential of the counter electrode 13 is higher than that of the pixel electrode 11 with reference to the pixel electrode 13, it is possible to collect a charge by the pixel electrode 11. More specifically, positive and negative charges are generated by incident light in the photoelectric conversion layer 12, and the positive charge (holes) is collected as the signal charge by the pixel electrode 11. The signal charge is temporarily accumulated in the charge accumulation region including, as part thereof, the conductive structure 52. As with the conductive structure 52, the impurity region 111 formed in the semiconductor substrate 110, the pixel electrode 11 of the photoelectric converter 10, and the gate electrode 22e of the signal detection transistor 22 also function as part of a charge accumulation region for temporarily accumulating signal charges. Example of method of driving imaging device 100

Figure 4:
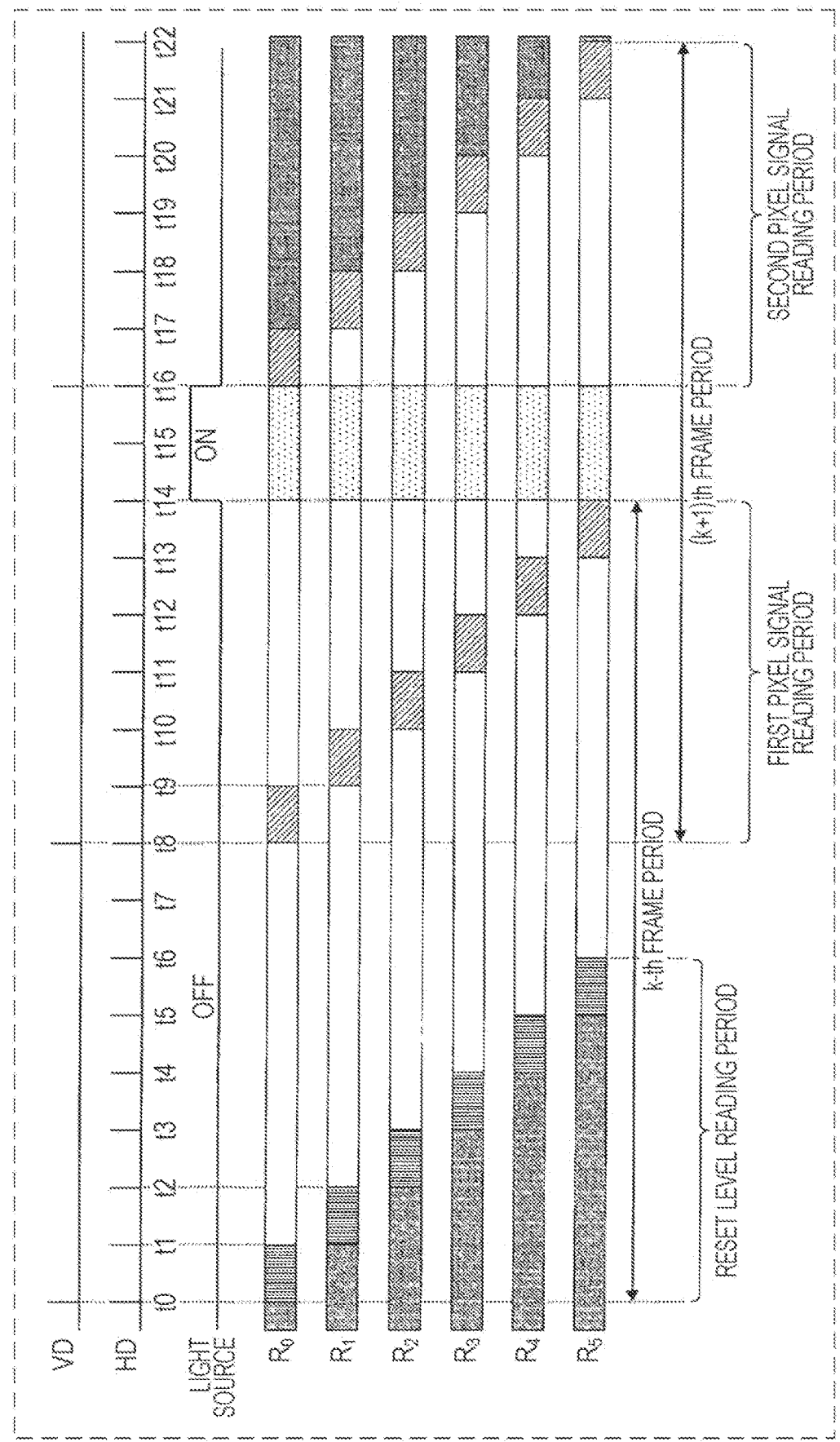
FIG. 4 is a diagram for explaining an example of a method of driving an imaging device according to an embodiment of the present disclosure.

FIG. 4 is a diagram for explaining an example of a method of driving an imaging device according to an embodiment of the present disclosure. In FIG. 4, a chart on the top shows pulses of the vertical synchronization signal VD. A rising edge of a pulse of the vertical synchronizing signal VD indicates a start of a frame period that includes, as part thereof, an exposure period for accumulating a signal charge. In FIG. 4, a chart in a second row from the top shows pulses of the horizontal synchronization signal HD. A period from a rise of one pulse to a rise of a next pulse corresponds to one horizontal scanning period 1H. In FIG. 4, a chart in a third row from the top shows on/off timing of the light source 200 controlled by the light source control apparatus 210.

In FIG. 4, a plurality of blocks included in the imaging region are also shown to indicate operations thereof. For the sake of simplicity, it is assumed here that the plurality of pixels Px are arranged in 6 rows from a 0th row $R_0$ to a 5th row $R_5$, and operations of the pixels Px are schematically indicated by a plurality of rectangular blocks. In FIG. 4, for example, open rectangular blocks schematically represent exposure periods in frame periods. Rectangular blocks hatched with vertical lines indicate periods for reading reset levels corresponding to signal levels in a dark state. Rectangular blocks hatched with diagonal lines indicate periods for reading pixel signals representing an image of a subject.

FIG. 4 illustrates an example of an operation based on a so-called rolling shutter in which the exposure and signal reading are executed in units of rows of pixels. In the following explanation, first, the 0th row $R_0$ is taken for explanation from the 0th row $R_0$ to the 5th row $R_5$. In acquiring an image, first, resetting of the charge accumulation region of each pixel Px is performed. In the example shown in FIG. 4, resetting of a plurality of pixels belonging to a 0th row $R_0$ is started at time t0 according to the vertical synchronization signal VD.

More specifically, the reset transistor 26 is turned on thereby setting the potential of the node FD so as to be equal to the potential of the reset voltage line 196. That is, the voltage of the pixel electrode 11 of the photoelectric converter 10 is set to be equal to the reset voltage $V_{RST}$. As can be seen from FIGS. 2 and 3, when the gate electrode 22e of the signal detection transistor 22 of the readout circuit 20 is electrically connected to the pixel electrode 11 via the conductive structure 52, the signal detection transistor 22 outputs a signal corresponding to the potential of the pixel electrode 11. That is, the readout circuit 20 outputs an analog signal corresponding to the potential of the pixel electrode 11 to the corresponding output signal line $S_j$ via a source follower including the signal detection transistor 22.

Thereafter, the reset transistor 26 is turned off and then the address transistor 24 is turned on. As a result, a signal corresponding to the reset voltage $V_{RST}$ applied to the gate electrode 22e of the signal detection transistor 22 is output to the output signal line $S_j$. The signal output to the output signal line $S_j$ in this situation is an analog signal representing a reset level, which usually includes reset noise generated when the reset transistor 26 is turned off. Hereinafter, for convenience, the analog signal representing the reset level is referred to simply as a reset signal.

The reset signal read to the output signal line $S_j$ is converted into a digital signal by the A/D conversion circuit 140. After the reset signal is read out, the address transistor 24 is turned off. As schematically shown in FIG. 4, in synchronization with the horizontal synchronization signal HD, the reading operation described above is sequentially executed on a row by row basis. The pulse interval of the horizontal synchronizing signal HD, that is, 1H period, represents a period from a selection of one row to a selection of a next row. In this example, pixels belonging to the 0th row $R_0$ are reset and signals are read out from these pixels in a period from time t0 to time t1, and pixels belonging to the 1st row $R_1$ are reset and signals are read out from these pixels in a period from time t1 to time t2. The operation is performed sequentially in a similar manner for the 2nd row $R_2$ and subsequent rows. As can be seen from the above description, the reset level reading period may include a reset period in which the potential of the charge accumulation region of the pixel is reset. In FIG. 4, the digital signal corresponding to the reset signal read out between time t0 and time t6 is stored in the first frame memory 172. That is, at a point of time when the reset level reading period is ended, the first frame memory 172 is in a state in which image data corresponding to one frame of digital signal is stored.

Referring again to pixels belong to the 0th row $R_0$, after the reset signal is read out, an exposure period is started. In the present example, for the 0th row $R_0$, a period from time t1 to time t8 is an exposure period in a kth frame period for the 0th row $R_0$, where k is an integer equal to or greater than 0. The exposure period is a period for accumulating the signal charge corresponding to the amount of exposure to the pixel in the charge accumulation region. The length of the exposure period for the plurality of pixels Px in each row is in the range of, for example, 1/60 seconds to 1/16000 seconds.

The counter electrode 13 of the photoelectric converter 10 of each pixel Px is supplied with a particular voltage V1 from the voltage supply circuit 190 via the voltage line 192 such that the counter electrode 13 is at a potential higher than that of the pixel electrode 11. In a state immediately after the resetting is performed, the potential of the pixel electrode 11 is determined by the reset voltage $V_{RST}$ described above, and a bias voltage equal to $V1-V_{RST}$ is applied between the pixel electrode 11 and the counter electrode 13.

Since the potential of the counter electrode 13 is relatively higher than that of the pixel electrode 11, positive charge of charge pairs generated via the photoelectric conversion is collected by the pixel electrode 11. A PN junction formed in the semiconductor substrate 110, which is formed as a result of the formation of the impurity region 111, provides a junction capacitance for temporarily storing the positive charge collected by the pixel electrode 11. In the case where holes are used as signal charges, the potential of the impurity region 111 functioning as the charge accumulation region increases as the signal charge is accumulated in the impurity region 111. In exemplary embodiments of the present disclosure, $V1-V_{RST}>0$. However, a voltage may be applied to the counter electrode 11 such that the potential of the counter electrode 13 is lower than that of the pixel electrode 13, and electrons may be used as signal charges.

After a predetermined time elapses, the pixel signal reading process is performed. In the present example, reading of signals from pixels belonging to the 0th row $R_0$ is started at time t8 according to the vertical synchronization signal VD. More specifically, the address transistors 24 in the readout circuit 20 of the pixels in the 0th row $R_0$ are turned on. As described above, the readout circuit 20 outputs an analog signal corresponding to the potential of the pixel electrode 11 to the corresponding output signal line $S_j$. The signal read out from the pixel of the 0th row $R_0$ is an analog signal corresponding to the amount of charge accumulated in the charge accumulation region in the exposure period for the 0th row $R_0$, and this analog signal represents an image of a subject based on environmental light such as sunlight. Hereinafter, for convenience of description, the analog signal corresponding to the amount of charge accumulated in the exposure period in a kth frame period is referred to as a first pixel signal. The first pixel signal includes reset noise generated when a reset operation is performed before the exposure period. After the first pixel signal is read out, the address transistor 24 is again turned off.

The first pixel signal read to the output signal line $S_j$ via the readout circuit 20 is converted to a digital signal by the A/D conversion circuit 140. In this embodiment of the present disclosure, the digital signal generated by the A/D conversion circuit 140 by the A/D conversion of the first pixel signal is temporarily stored in the second frame memory 174.

As for the 1st row $R_1$ to the 5th row $R_5$, the above-described exposure operation and the signal reading operation are sequentially performed on a row by row basis in a period from time t9 to time t14. When the reading of the first pixel signals for the 0th row $R_0$ to the 5th row $R_5$ is completed, the kth frame period ends. At this point of time, the second frame memory 174 is in a state in which image data corresponding to one frame of a digital signal is stored.

Next, acquiring of image data of a (k+1)th frame period following the kth frame period is performed. In this acquisition process, the process of accumulation a signal charge in each pixel Px and the process of reading a signal are basically the same as those in the kth frame period. However, pixels Px are not reset between the kth frame period and the (k+1)th frame period.

In the example shown in FIG. 4, for the case of the 0th row $R_0$, the exposure period in the (k+1)th frame period starts at time t8. In this embodiment of the present disclosure, the resetting of pixels Px is not performed between the exposure period in the kth frame period and the following exposure period, that is, the exposure period in the (k+1)th frame period. Therefore, in the reading of the first pixel signal via the readout circuit 20, flowing of the signal charge out of the charge accumulation region and further flowing of the charge into the charge accumulation region basically do not occur. That is, the reading of the first pixel signal via the readout circuit 20 is performed nondestructively. Therefore, when the exposure period in the (k+1)th frame period starts, signal charges generated by photoelectric conversion in the exposure period in the (k+1)th frame period are accumulated in the charge accumulation regions of the respective pixels Px such that the signal charges are added to the signal charges accumulated in the previous exposure period.

In the case of the 0th row $R_0$, in this example, the period from time t9 to time t16 at which reading of the analog signal via the readout circuit 20 is started corresponds to the exposure period of the (k+1)th frame period. Here, in the present embodiment of the disclosure, one of the exposure period in the kth frame period or the exposure period in the (k+1)th frame period includes a period for which the light source 200 is in the on-state. In the example shown in FIG. 4, the light source is in the on-state for a period from time t14 to time t16.

For the period in which the light source 200 is in the on-state, the subject is irradiated with light, for example, infrared light emitted from the light source 200 such that the light is superimposed on environmental light. As a result, signal charges corresponding to the intensity of light including the infrared light reflected from the subject are accumulated in the charge accumulation regions of the respective pixels Px. That is, the increase in the potential of the charge accumulation region caused by cumulative accumulation of signal charges during a period starting from the exposure period of the kth frame period includes an increase caused by the irradiation of infrared light. This increase in potential reflects the amount of signal charge obtained when the subject is irradiated only with the infrared light. In particular, in this example, as schematically shown in FIG. 4, the length of the on-period of the light source 200 included in the exposure period is common among the rows of pixels Px. Therefore, the pixel signal corresponding to the increase in the signal charge caused by turning on the light source 200 represents the image of the subject based on the infrared light emitted from the light source 200.

As for the light emitted from the light source 200, infrared light having a peak at a first wavelength in the infrared region may be used. It may be advantageous to use infrared having the first wavelength peak in a range, for example, from 1300 nm to 1500 nm, because a wavelength that is not included in the spectrum of sunlight can be effectively utilized. By selecting a wavelength which is not included in the spectrum of sunlight as the first wavelength, it is possible to perform imaging while suppressing the influence of disturbance of light. In applications such as distance measurement using the light from the light source 200, the light source 200 emits light having a pattern such as stripes or random dots such that a reflected light pattern changes depending on the unevenness of the subject surface.

After the exposure period ends, in the same manner as the kth frame period, the readout of the pixel signals is sequentially executed for each row of the plurality of pixels Px. In this example, the reading of a plurality of pixels belonging to the 0th row $R_0$ is started from the time t16 according to the vertical synchronization signal VD. An analog signal read from each pixel via the readout circuit 20 in this process is a signal corresponding to an amount of charge cumulatively accumulated in the pixel during the exposure period in the kth frame period and the exposure period in the (k+1)th frame period. Hereinafter, this analog signal is referred to as a second pixel signal. When the reading of the second pixel signal from the plurality of pixels belonging to the 5th row $R_5$ is completed, the (k+1)th frame period ends. In this example, the (k+1)th frame period ends at time t22.

The second pixel signal read to the output signal line $S_j$ via the readout circuit 20 is converted into a digital signal by the A/D conversion circuit 140 and output to the image processing circuit 170 in the same manner as the first pixel signal. The image processing circuit 170 calculates the difference the digital signal corresponding to the second pixel signal, for example, of the (k+1)th frame period and the digital signal corresponding to the first pixel signal of the kth frame period temporary stored in the second frame memory 174. Hereinafter, for convenience, this difference is referred to as the "first difference".

During the exposure period of the (k+1)th frame period, signal charges corresponding to the intensity of light reflected from a subject are cumulatively accumulated in the charge accumulation regions of the respective pixels, wherein the light reflected from the subject includes infrared light originating from the light source 200. That is, the signal charge accumulated during the exposure period of the (k+1)th frame period includes a charge generated by the photoelectric conversion of the ambient light reflected by the subject, and a charge generated by the photoelectric conversion of light which is emitted from the light source 200 and reflected by the subject. As for the amount of the former charge, the amount of charge accumulated in the charge accumulation region of the pixel during the exposure period of the (k+1)th frame period has substantially no difference from that accumulated during the exposure period of the kth frame period if the length of the exposure period is substantially the same between the (k+1)th frame period and the kth frame period. Therefore, the first difference calculated as a difference between the digital signal corresponding to the second pixel signal and the digital signal corresponding to the first pixel signal corresponds to the sum of the amount of signal charge reflecting the intensity of light reflected from the subject under ambient light such as sunlight or light from a lighting fixture and the amount of signal charge obtained when the subject is irradiated only with pure infrared light.

Here, since the first pixel signal includes reset noise, the digital signal stored in the second frame memory 174 includes a signal component corresponding to the reset noise. However, in the embodiment of the present disclosure, the pixels are not reset between two adjacent frame periods, and thus the signal component corresponding to the reset noise is also included in the digital signal corresponding to the second pixel signal of the (k+1)th frame period. Therefore, the signal component corresponding to the reset noise disappears in the first difference obtained by digitally determining the difference between the digital signal stored in the second frame memory 174 and the digital signal corresponding to the second pixel signal.

The image processing circuit 170 calculates the difference between the digital signal temporarily stored in the second frame memory 174 and the digital signal corresponding to the reset signal temporarily stored in the first frame memory 172. Hereinafter, for convenience, this difference is referred to as the "second difference". As described above, the digital signal temporarily stored in the first frame memory 172 includes the signal component corresponding to the reset noise. However, the signal component corresponding to the reset noise is also removed via the process of calculating the second difference. That is, the second difference corresponds to the amount of signal charge that reflects the intensity of light reflected from a subject under ambient light such as sunlight or light emitted from a luminaire.

The image processing circuit 170 outputs the difference between the first difference and the second difference. Here, the image processing circuit 170 outputs, as a final signal, a digital signal obtained by subtracting the second difference from the first difference. The first difference corresponds to the sum of the amount of signal charge that reflects the intensity of light reflected from the subject under ambient light such as sunlight or light emitted from the luminaire and the amount of signal charge obtained when the subject is irradiated only with infrared light, while the second difference corresponds to the former of these. Therefore, the difference between the first difference and the second difference represents an image obtained when shooting is performed under only the light emitted from the light source 200. That is, it is possible to obtain image data based on the charge generated by the photoelectric conversion of the component of the light emitted from the light source 200 and reflected by the subject. Note that the output obtained here does not include the signal component corresponding to the reset noise. Therefore, it is possible to construct an image relating to the first wavelength in a form in which the influence of the reset noise is canceled, and thus it is possible to achieve an improvement in the accuracy of measurement in applications of distance measurement.

As described above, according to the embodiment of the present disclosure, it is possible to obtain image data relating to a specific wavelength in a form in which the influence of reset noise is canceled. In the above description, it is assumed by way of example that the image processing circuit 170 calculates the first difference and the second difference, and further calculates the difference between the first and second differences. However, it is not essential that the intermediate value corresponding to the first difference and the intermediate value corresponding to the second difference are stored in the memory or the like as long as the digital signal or the pixel values substantially representing the image obtained when shooting is performed under only the light emitted from the light source 200.

Alternatively, the difference between the second difference and the first difference may be determined as follows. First, the second difference is determined by calculating the difference between digital signal corresponding to the first pixel signal temporarily stored in the second frame memory 174 and the digital signal corresponding to the reset signal temporarily stored in the first frame memory 172, and the resultant second difference is overwritten in the first frame memory 172. After that, the first difference is determined by calculating the difference between the digital signal corresponding to the second pixel signal and the digital signal temporarily stored in the second frame memory 174, and the result is overwritten in the second frame memory 174. Then, the difference is calculated between the result of the calculation of the second difference stored in the first frame memory 172 and the result of the calculation of the first difference stored in the second frame memory 174.

In the process described above, the light source 200 is set to be in the on-state during the exposure period of the (k+1)th frame period following the kth frame period which are frame periods adjacent to each other. However, the light source 200 may be set to be in the on-state selectively during the exposure period of the kth frame period preceding the (k+1)th frame period. In this case, contrary to the previous example, the first difference represents the intensity of the light reflected from the subject under ambient light such as sunlight or light emitted from the luminaire, and the second difference represents the sum of this intensity and the intensity related to the infrared light emitted from the light source 200. Therefore, by subtracting the first difference from the second difference, it is possible to obtain image data based on the charge generated by the photoelectric conversion of a component of light which is part of the light emitted from the light source 200 and reflected from the subject. Also in this case, the effect of reset noise is canceled via the process of determining the difference between the first difference and the second difference.

As described above, in the embodiment of the present disclosure, in two adjacent frame periods including a prior frame period and a subsequent frame period, the pixel signal corresponding to the amount of signal charge accumulated in an exposure period of a prior frame period is read out nondestructively, and the pixel signal generated by the exposure during the exposure period of the subsequent frame period is cumulatively accumulated and the pixel signal is read out. Furthermore, the difference between these pixel signals is acquired in the form of a digital signal. As a result, it is possible to obtain image data corresponding to the sum of the amount of signal charge accumulated during the exposure period of the prior frame period and the amount of signal charge accumulated in addition to the above amount of signal charge. Note that the component corresponding to the reset noise is removed when the difference is calculated.

In the embodiment of the present disclosure, the difference between the pixel signal corresponding to the amount of signal charge accumulated in the exposure period of the prior frame period and the analog signal read from the pixels before the start of this exposure period is also acquired in the form of a digital signal. As a result, the component corresponding to the reset noise can be removed, and image data corresponding to the pure amount of signal charge accumulated in the exposure period of the prior frame period can be obtained. By calculating the difference between these image data, it is possible to obtain image data based on the amount of signal charge cumulatively accumulated in the exposure period of the subsequent frame period in a form in which the component corresponding to the reset noise is removed.

Furthermore, in the embodiment of the present disclosure, since the light source 200 is set to be in the on-state during part of the exposure period of one of the prior frame period or the subsequent frame period, it is possible to obtain an image substantially based on only the light emitted from the light source 200 by acquiring the difference between the first difference and the second difference. Since the pixels are not reset every frame period, it is possible to also achieve an improvement in the frame rate.

In the example described above with reference to FIG. 4, the digital signal stored in the first frame memory 172 is given, by way of example, by a digital signal obtained via an analog-to-digital conversion from the reset signal. However, the digital signal stored in the first frame memory 172 is not limited to the digital signal corresponding to the reset signal. Instead of the digital signal corresponding to the reset signal, for example, the pixel signal corresponding to the amount of signal charge accumulated in the pixel during the exposure period included in the frame period immediately previous to the two adjacent frame periods may be read out, and the digital signal corresponding to this pixel signal may be stored in the first frame memory 172. Also in this case, by calculating the difference between the first difference and the second difference, it is possible to obtain the image substantially based only on the infrared light from the light source 200, as in the example described above with reference to FIG. 4, in a form in which the component corresponding to the reset noise is removed. Also in this case, the pixel reset operation is not performed between the two adjacent frame periods. Another example of operation of the imaging device 100

Figure 5:
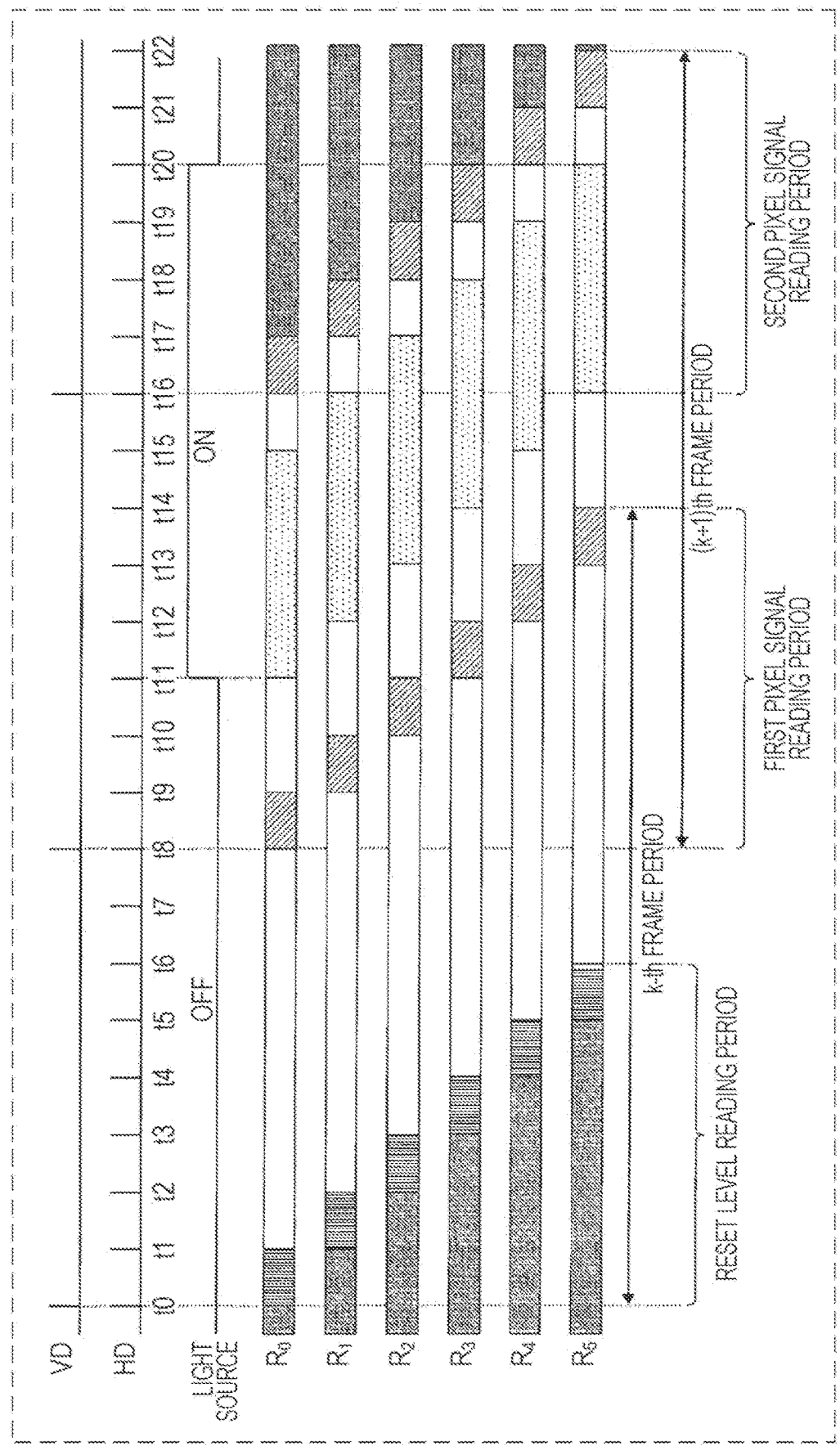
FIG. 5 is a diagram for explaining another example of an operation of an imaging device according to an embodiment of the present disclosure.

FIG. 5 is a diagram for explaining another example of an operation of the imaging device 100. In the example shown in FIG. 5, the light source 200 is in the on-state for a period from time t11 to t20 in the exposure period in the (k+1)th frame period. In the embodiment of the present disclosure, it is not essential to irradiate an entire subject at a time with light emitted from the light source 200. As described below, for example, light emitted from the light source 200 may be scanned over the subject by using an optical system such as a MEMS mirror.

Figure 6:
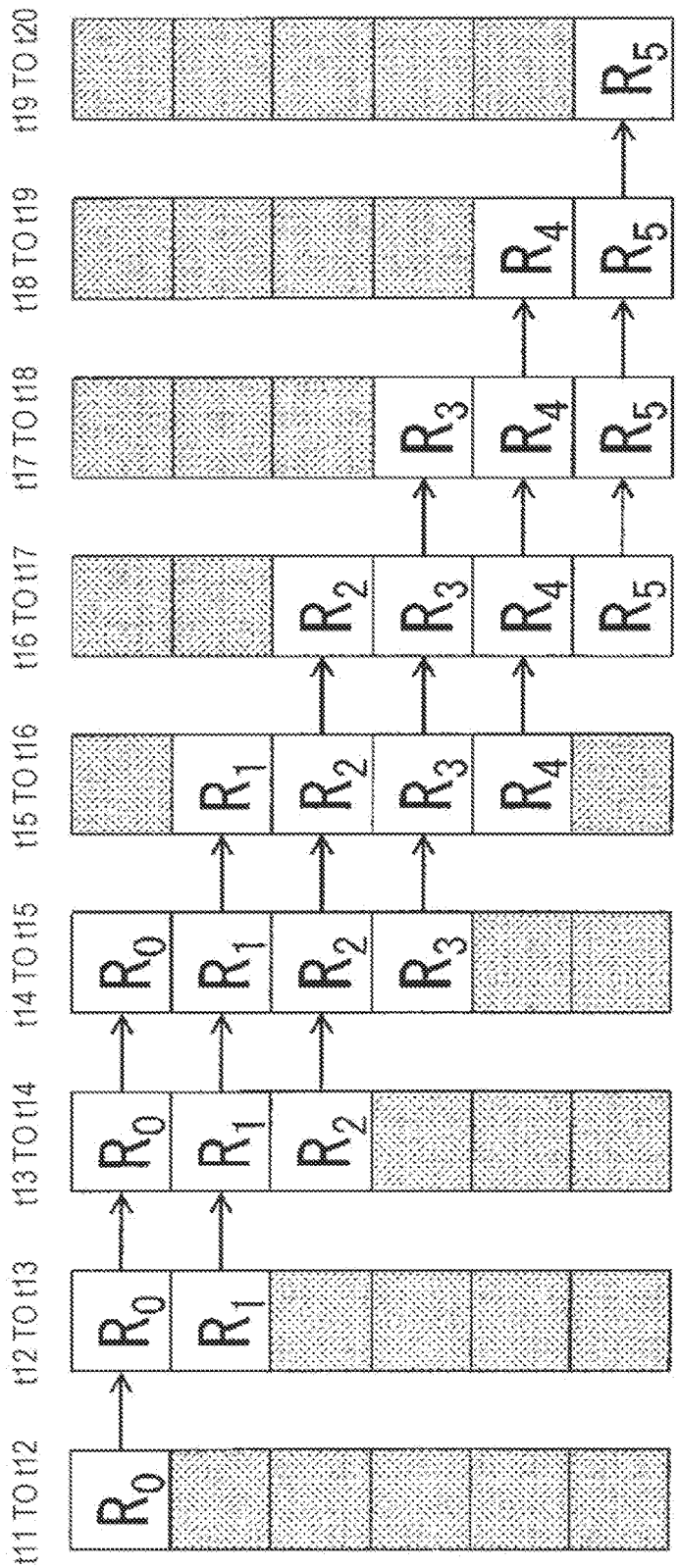
FIG. 6 is a schematic diagram for explaining a manner in which an area irradiated with light from a light source moves over a subject in a period in which the light source is in an on-state.

FIG. 6 schematically illustrate a manner in which an area of a subject is illuminated with light emitted from the light source 200 and the area illuminated with light moves over the subject during a period in which the light source 200 is in the on-state. In the example shown in FIG. 6, the subject is scanned in the vertical direction by the light from the light source 200. In FIG. 6, among six vertically aligned rectangular blocks are shown for each 1H period, open blocks represent areas on the surface of the subject illuminated by the light from the light source 200. In this example, as schematically shown in FIG. 6, the area illuminated by the light from the light source 200 moves from top to bottom on the paper surface.

Reference symbols such as "$R_0$" put in open blocks in FIG. 6 indicate which pixel in rows of pixels Px receives the reflected light from a region corresponding to the block. As can be seen from FIG. 6, the length of signal charge accumulation time during which the signal charge is accumulated in response to light from the light source 200 is equally four times the 1H period for any of the six rows.

Figure 7:
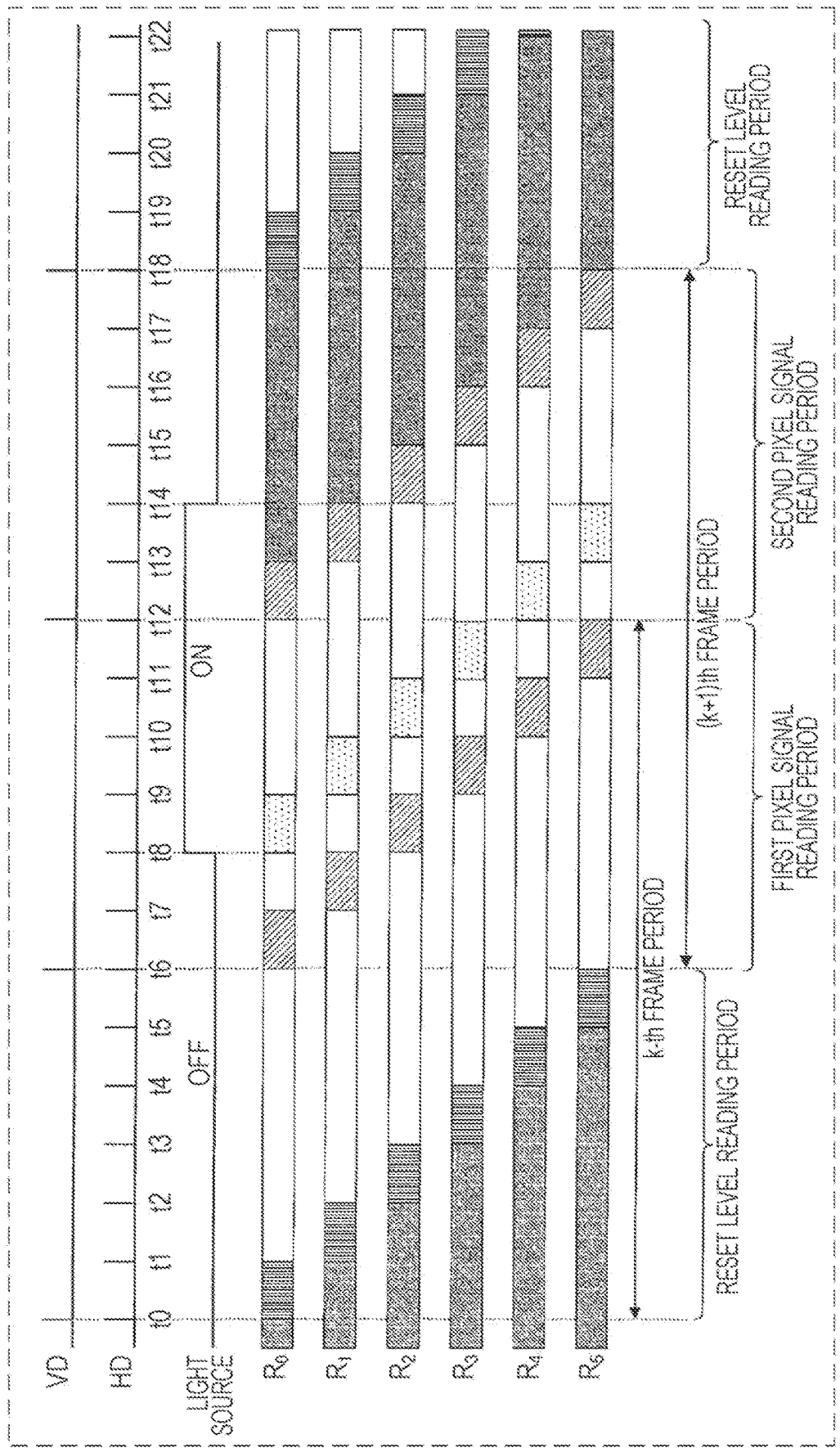
FIG. 7 is a schematic diagram illustrating an example in which light from a light source is scanned faster than in the example shown in FIG. 5.
Figure 8:
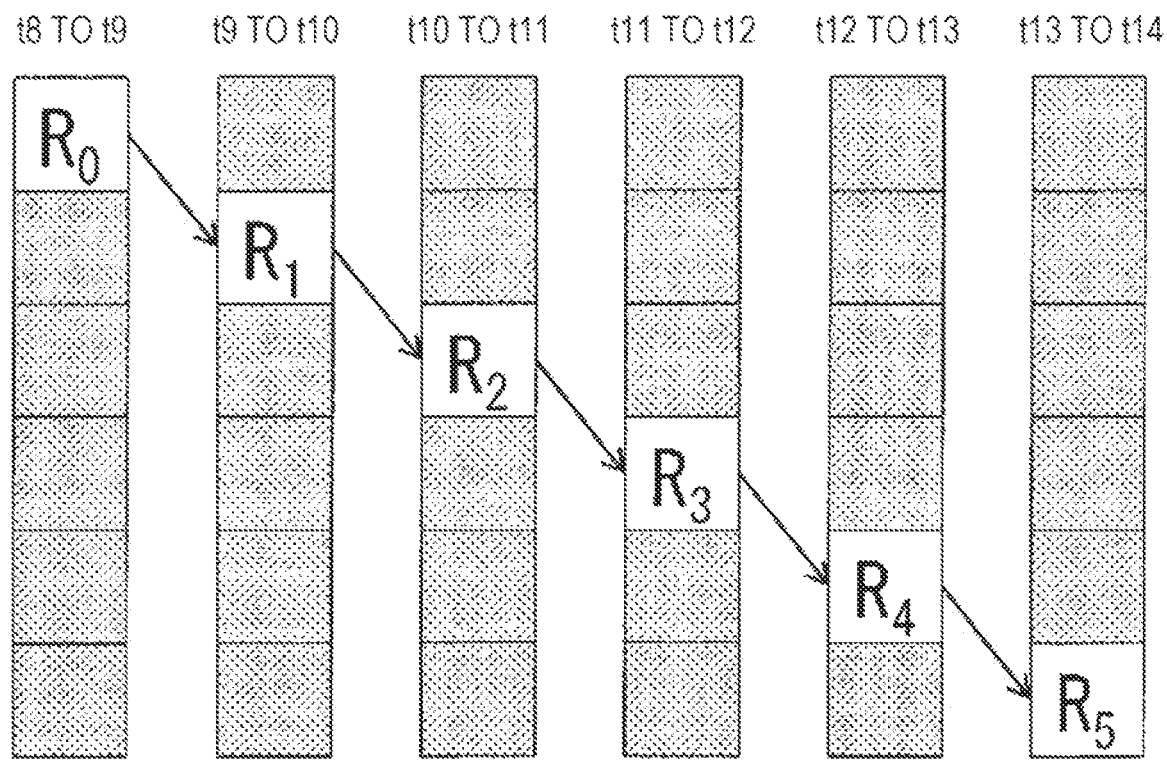
FIG. 8 is a schematic diagram for explaining a manner in which, in the example shown in FIG. 7, an area irradiated with light from a light source moves over a subject.

FIGS. 7 and 8 each show an example in which light from the light source 200 is scanned in a faster manner. FIGS. 7 and 8 are diagrams respectively corresponding to FIGS. 5 and 6. In the example shown in FIG. 7, in contrast to the example shown in FIG. 5, a 1V period, which is the pulse interval of the vertical synchronization signal VD, is shortened from 8 times 1H to 6 times 1H.

In this example, the period for which the light source 200 is in the on-state is shortened to a period from time t8 to time t14, and the subject is scanned from its upper end to its lower end by the light emitted from the light source 200 in the period which is 6 times as long as 1H. As shown schematically in FIG. 8, a plurality of pixels Px are scanned such that the row of a pixel that receives light that is emitted from the light source 200 and reflected by the subject is transitioned every 1H. That is, in this example, the period in which the signal charge is accumulated in response to the light emitted from the light source 200 has a length equal to 1H which is common to all six blocks aligned vertically. Thus, the frame rate can be further increased by shortening the 1V period and increasing the speed of scanning of light from the light source 200 in the above-described manner.

In the example shown in FIG. 7, after the reading of the second pixel signal is completed, the reset operation in the next frame period is started at time t18 in synchronization with a pulse of the vertical synchronization signal VD. In the operation of pixels Px in the 0th row $R_0$ to the 5th row $R_5$, as indicated schematically by dot shaded rectangles in FIG. 7, a period in which accumulating of signal charge is basically unnecessary exists between reading the second pixel signal in the (k+1)th frame period and the start of reading the reset signal in the next (k+2)th frame period.

If the voltage V1 supplied from the voltage supply circuit 190 to the counter electrode 13 via the voltage line 192 is adjusted such that the bias voltage applied between the pixel electrode 11 and the counter electrode 13 is equal to $V1-V_{RST}=0$, then the signal charge is not hardly collected by the pixel electrode 11 even when the charge is generated by the photoelectric conversion. In other words, it is possible to achieve the state similar to that which occurs when the mechanical shutter is closed. By setting the bias voltage applied between the pixel electrode 11 and the counter electrode 13 to be substantially equal to 0 V for the period in which it is not necessary to accumulate signal charges, it is possible to suppress a dark current to occur in the photoelectric conversion layer 12.

By setting the bias voltage applied between the pixel electrode 11 and the counter electrode 13 to be substantially equal to 0 V for all rows of pixels Px, it is possible to provide a signal charge accumulation period in common to all pixels, that is, it is possible to realize a function of a so-called global shutter. See, for example, International Publication No. 2017/094229 for further detailed information on the global shutter realized by controlling the bias voltage between the pixel electrode 11 and the counter electrode 13. The entire contents of International Publication No. 2017/094229 are incorporated herein by reference.

Figure 9:
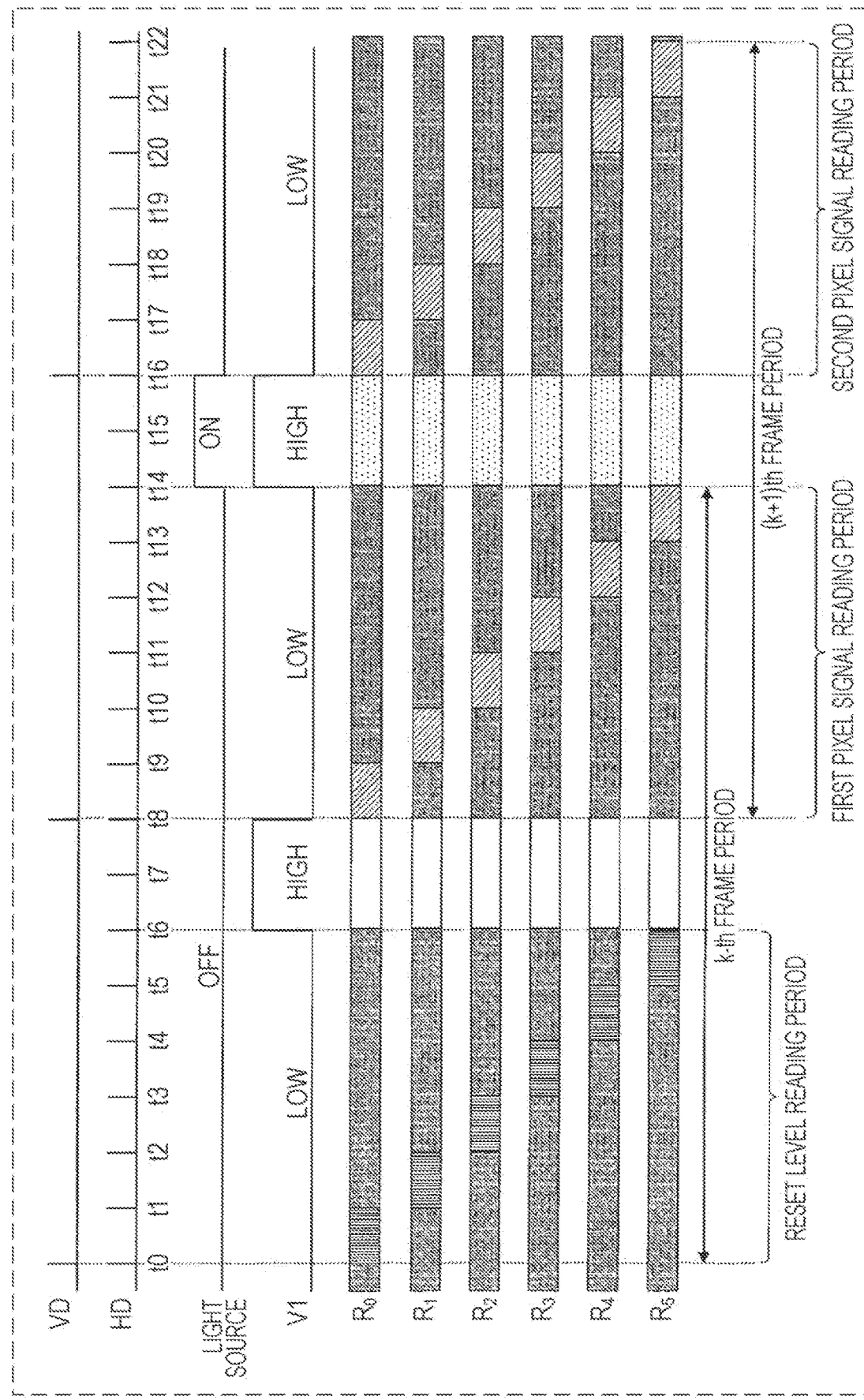
FIG. 9 is a diagram for explaining still another example of an operation of an imaging device according to an embodiment of the present disclosure.

FIG. 9 schematically illustrates still another example of an operation of the imaging device 100. In the example shown in FIG. 9, the voltage V1 supplied from the voltage supply circuit 190 to the counter electrode 13 is set to a high level selectively in a period from time t6 to time t8 in an exposure period included in the kth frame period. For the plurality of pixels Px in each row, the voltage V1 is lowered to a low level in periods in the exposure period other than the period from time t6 to time t8. In FIG. 9, "LOW" indicates that the voltage output from the voltage supply circuit 190 is adjusted such that the bias voltage applied between the pixel electrode 11 and the counter electrode 13 is equal to $V1-V_{RST}=0$.

In this period, even when light is incident on the photoelectric converter 10, substantially no signal charge is accumulated. In other words, the effective period for accumulating the signal charge in the kth frame period is limited to the period from time t6 to time t8. Note that the period in which the accumulation of signal charges actually occurs is equal for all rows from the 0th row $R_0$ to the 5th row $R_5$. That is, the acquisition of the pixel signals by the global shutter is executed.

In the case of the (k+1)th frame period, for example, the voltage V1 supplied from the voltage supply circuit 190 to the counter electrode 13 is set to the high level selectively during a period from time t4 to time t6, which is a part of the exposure period. In this example, the light source 200 is in the on-state in a period from time t14 to time t16 equally for all rows. Thus, the global shutter is also applied to the acquisition of the second pixel signal. By acquiring the difference between the digital signal corresponding to the second pixel signal and the digital signal corresponding to the first pixel signal, it is possible to obtain an image based on infrared light with no distortion even when the subject is moving at high speed.

In each example described above, the pixels Px are reset before the accumulation of the signal charge in the exposure period included in the prior frame period of the two successive frame periods. In other words, in each of the above described examples, the resetting of the pixels Px is performed in units of two frame periods. However, the cycle of the resetting of pixels Px is not limited to twice the frame period. The signal charge may be accumulated cumulatively over a plurality of frame periods as long as the amount of accumulated charge does not exceed the capacity of the charge accumulation region.

Figure 10:
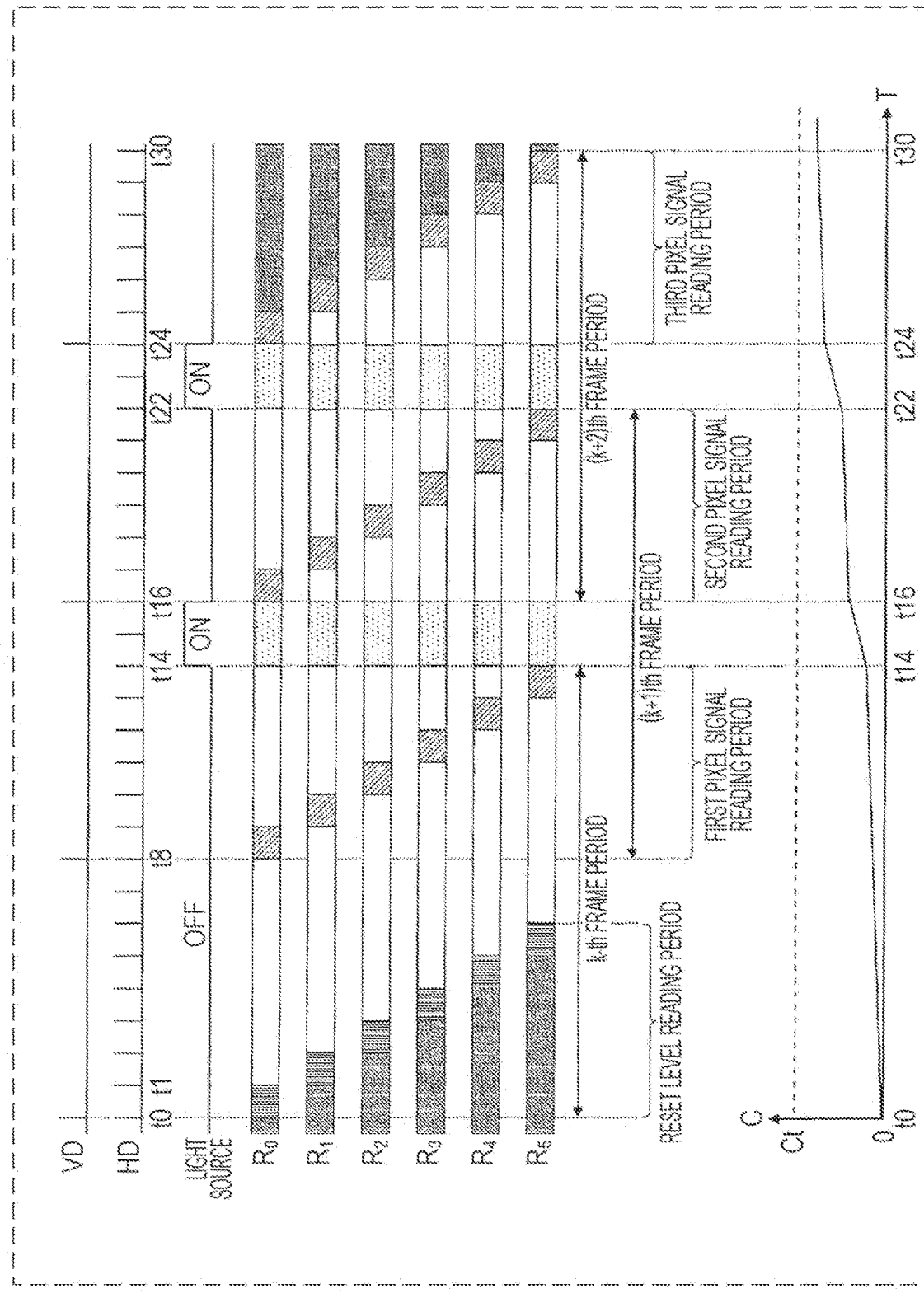
FIG. 10 is a diagram for explaining still another example of an operation of an imaging device according to an embodiment of the present disclosure.

FIG. 10 schematically illustrates still another example of an operation the imaging device according to an embodiment of the present disclosure. FIG. 10 also includes a graph schematically illustrating a temporal change in the amount of signal charge accumulated in the charge accumulation region for one pixel belonging to a 0th row $R_0$ of a plurality of pixels Px included in the imaging region. In the graph shown at the bottom of FIG. 10, the horizontal axis represents time T. The vertical axis of the graph represents the amount of signal charge C accumulated in the charge accumulation region of a pixel of interest, and the reading of the vertical axis of the graph corresponds to the potential value of the node FD. A broken line in the graph shown at the bottom of FIG. 10 represents a saturation amount of charge Ct, which is the maximum possible value of the amount of charge accumulated in the charge accumulation region of the pixel.

In the example shown in FIG. 10, before the start of the exposure period included in the kth frame period, pixels in each row are reset and reset signals are read. After that, as in the example described above with reference to FIG. 4, reading of the first pixel signal in the kth frame period (from time t8 to time t14) and the second pixel signal in the following (k+1)th frame period (from time t16 to time t22) are performed.

Here, the graph shown at the bottom of FIG. 10 indicates a change in the amount of charge accumulated in the charge accumulation region which is the greatest among the plurality of pixels Px included in the imaging region at a point of time at which the reading of the second pixel signal is completed. In this example, at the end of the (k+1)th frame period (at time t22), the total amount of signal charge accumulated in the charge accumulation region of the pixel is less than the saturation amount of charge Ct described above. Therefore, at the end of the (k+1)th frame period, each of the plurality of pixels Px included in the imaging region is in a state where a further signal charge can be cumulatively accumulated in the charge accumulation region.

In a case where the charge accumulation region of each pixel is capable of accepting an additional signal charge at the end of two consecutive frame periods, the exposure operation in the next frame period may be started without performing resetting of pixels. In this example, following the reading of the second pixel signal, the (k+2)th frame period is started and the signal charge is accumulated. Here, the total amount of signal charge accumulated in the charge accumulation region of each pixel is less than the saturation amount of charge Ct at the end of the (k+2)th frame period. Therefore, a third pixel signal read from each pixel after the completion of the exposure period of the (k+2)th frame period can also be effectively used. Note that the "third pixel signal" in FIG. 10 indicates an analog signal corresponding to the amount of charge cumulatively accumulated in each pixel during the exposure periods included in the kth, (k+1)th, and (k+2)th frame periods.

The operation such as that illustrated in FIG. 10 is effective particularly when the infrared light is emitted from the light source such that the infrared light strikes the same target subject a plurality of times. For example, as shown in FIG. 10, the light source 200 may be in the on-state for a part of the exposure period in the (k+2)th frame period. When the operation is performed in the above-described manner, the infrared light reflected from the subject can be received a plurality of times and the signal charge can be cumulatively accumulated, it is possible to achieve a higher signal level which allows an improvement in the SN ratio.

Figure 11:
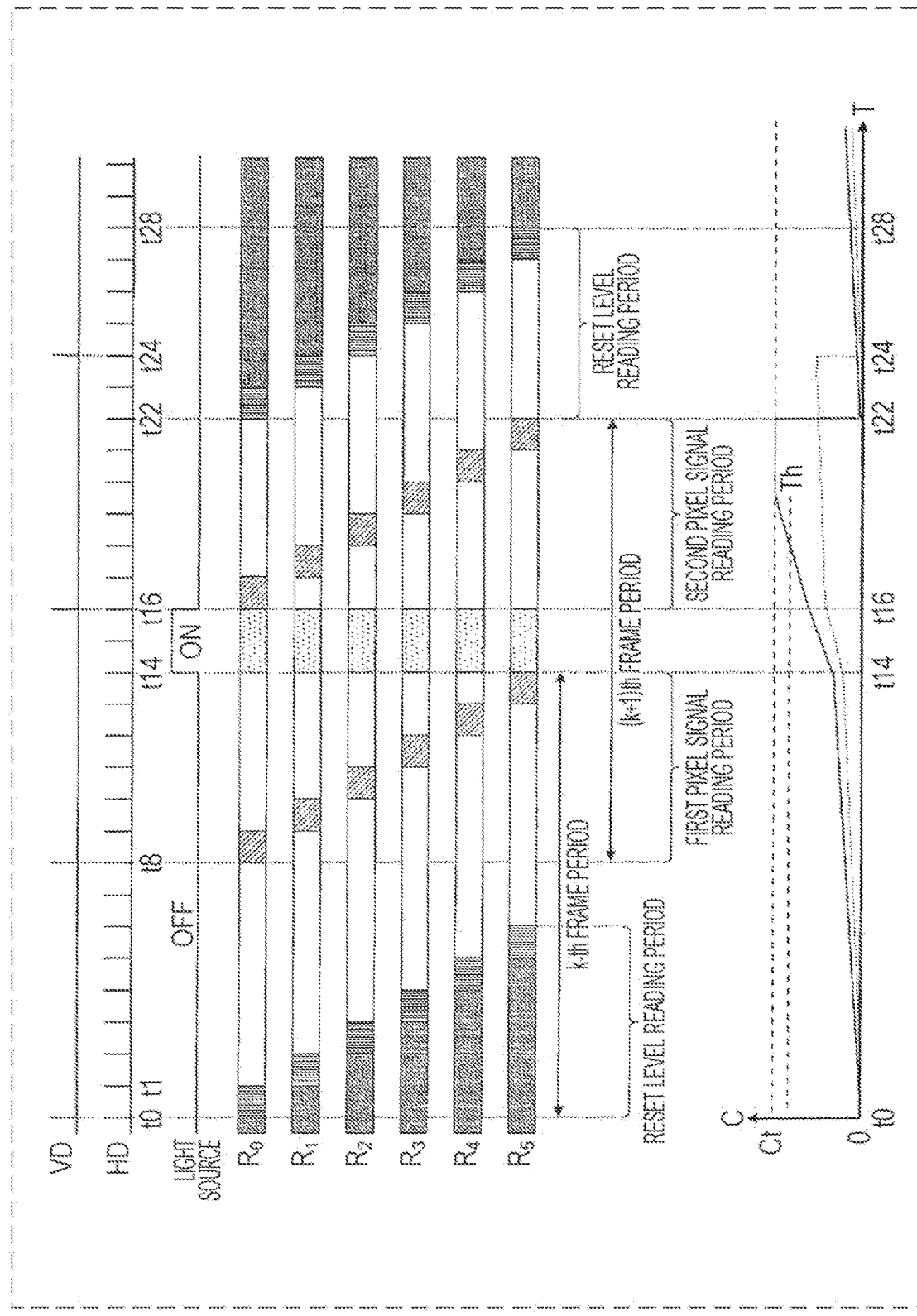
FIG. 11 is a diagram for explaining still another example of an operation of an imaging device according to an embodiment of the present disclosure.

The determination as to whether or not to start the exposure for the next frame period without performing the pixel reset operation following two consecutive frame periods may be made depending on whether the total amount of signal charge accumulated in the charge accumulation region exceeds the saturation amount of charge Ct. FIG. 11 schematically illustrates an example in which the pixel reset operation is executed when it is determined that the total amount of signal charge accumulated in the charge accumulation region exceeds the saturation amount of charge Ct. The graph at the bottom of FIG. 11 includes, in addition to a broken line indicating the saturation amount of charge Ct, a broken line indicating a threshold value that provides a criterion for determining whether or not to execute the pixel reset operation. The threshold value Th is appropriately set, in advance, to value smaller than the saturation amount of charge Ct.

In the graph shown at the bottom of FIG. 11, a solid line represents an example of a change in amount of signal charge in one of pixels belonging to one of rows (for example, 0th row $R_0$) in the imaging region, while a dotted line represents an example of a change in amount of signal charge in one of pixels belonging to another one of rows (for example, 2nd row $R_2$). In this example, the amount of signal charge accumulated in the charge accumulation region of a pixel in the 2nd row $R_2$ is smaller than the above-described threshold value Th even at the end of the (k+1)th frame period (at time t22). On the other hand, the amount of signal charge accumulated in the charge accumulation region of the pixel in the 0th row $R_0$ exceeds the threshold value Th before the end of the (k+1)th frame period, due to the exposure is performed following the reading of the second pixel signal.

Therefore, in this example, after the end of the (k+1)th frame period, the pixel reset operation is executed again before the start of the next frame period (from time t22 to time t28). As a result, the potential of the charge accumulation region of each pixel is reset, which makes it possible to prevent the acquisition of an image deteriorated due to an overflow of the signal charge. In this way, the amount of signal charge accumulated in the charge accumulation region of the pixel is monitored, the determination is performed as to whether or not the total amount of signal charge exceeds a predetermined threshold value Th, and the pixel reset operation is performed depending on the result of the determination. The amount of signal charge accumulated in the charge accumulation region can be known, for example, by monitoring the analog voltage read to the output signal line $S_j$ via the readout circuit 20 or the digital signal output from the A/D conversion circuit 140.

Figure 12:
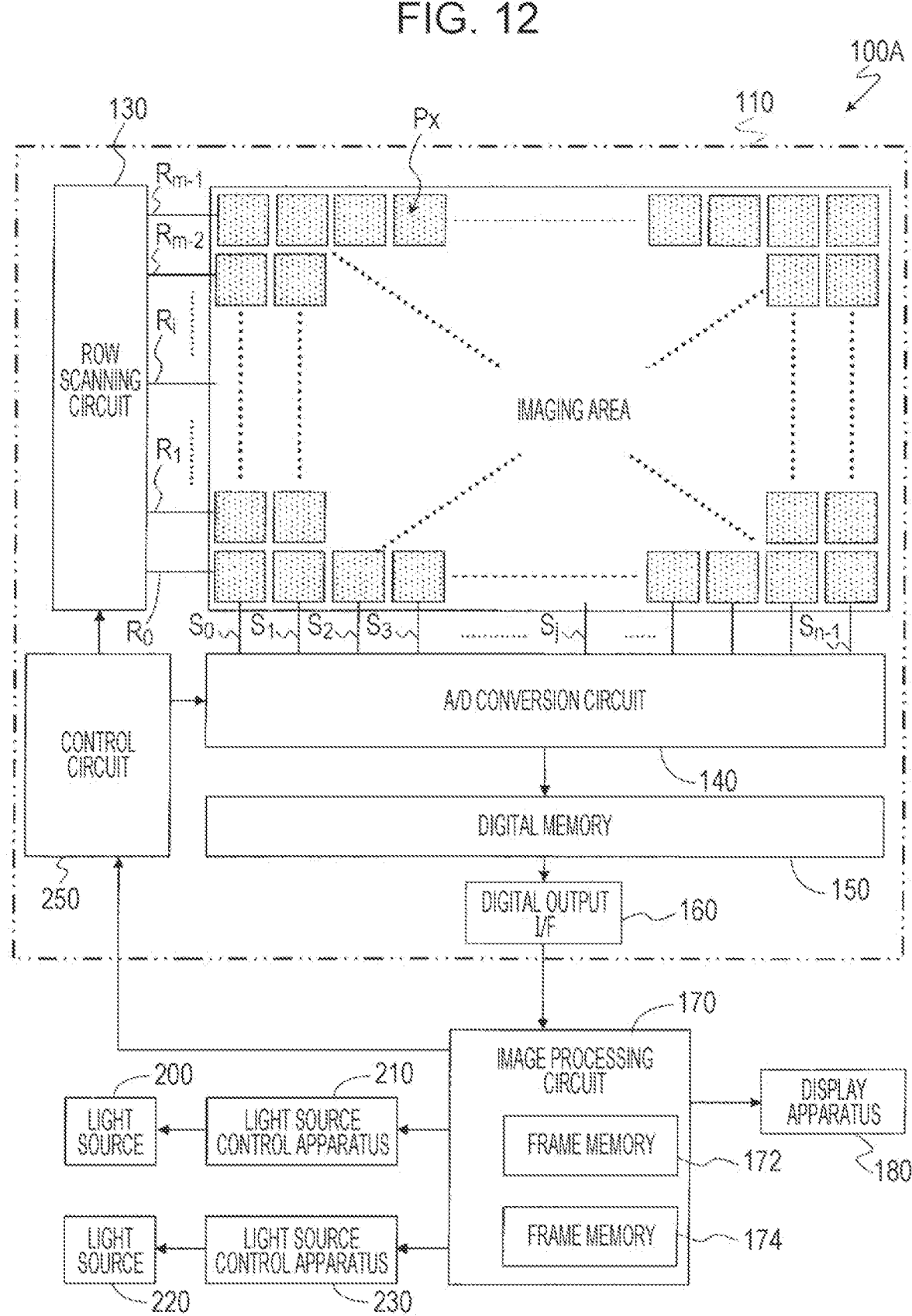
FIG. 12 is a diagram schematically illustrating an example of a configuration of an imaging device according to another embodiment of the present disclosure.

FIG. 12 schematically illustrates an example of a configuration of an imaging device according to another embodiment of the present disclosure. In addition to the components of the imaging device 100 described above with reference to FIG. 1, the imaging device 100A shown in FIG. 12 further includes a second light source 220 and a light source control apparatus 230 connected to the light source 220. The light source control apparatus 230 is connected to the image processing circuit 170, and the light source control apparatus 230 controls the operation of the light source 220 according to a control signal supplied from the image processing circuit 170. The light source 220 is in the on-state, for example, for exposure periods in the kth and (k+1)th frame periods, different from the exposure periods for which the light source 200 is in the on-state.

Figure 13:
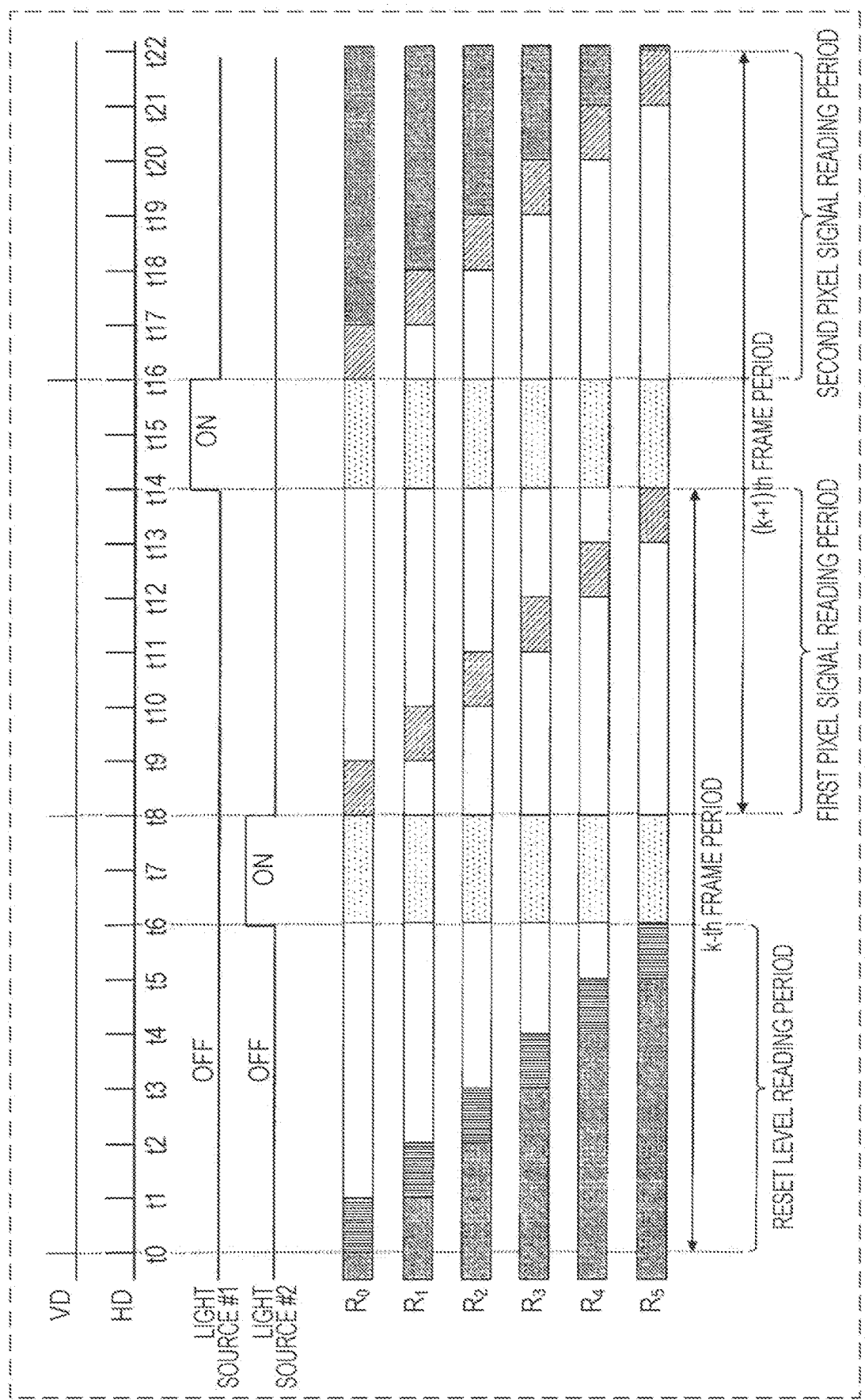
FIG. 13 is a diagram for explaining an example of a method of driving the imaging device shown in FIG. 12.

The light source 220 emits light having a peak at a second wavelength different from the first wavelength described above. The light source 220 may be an infrared light source that emits infrared light like the light source 200. However, as for the peak wavelength of light emitted from the light source 220, a second wavelength different from the above-described first wavelength is selected. Example of method of driving imaging device 100A FIG. 13 is a diagram for explaining an example of a method of driving the imaging device 100A shown in FIG. 12. Here, a light source that emits infrared light whose wavelength peak is not located at any wavelength near 1450 nm or 1940 nm is used as the first light source 200, while a light source that emits infrared light whose wavelength peak is located near 1450 nm is used as the second light source 220. The example of the operation shown in FIG. 12 is useful when the illuminance of the ambient light in the visible wavelength region is low, such as in the outdoors at night, or when the photoelectric conversion layer 12 of the photoelectric converter 10 is not sensitive to light in the visible wavelength range.

In the example shown in FIG. 13, the reset signal is read out during a period from time t0 to time t6, and, after that, an exposure operation in the kth frame and an exposure operation in the (k+1)th frame are executed. Furthermore, the light source 220 is set to be in the on-state selectively during a period from time t6 to time t8 in the kth frame period, and the light source 200 is set to be in the on-state selectively during a period from time t14 to time t16 in the (k+1)th frame period.

In a case where the light source 220 is set to be in the on-state selectively during part of the exposure period in an environment where there is almost no sunlight or artificial lighting in the visible wavelength range, the light emitted from the light source 220 and reflected by the subject occupies most of the light reaching the photoelectric converter 10 of each pixel. That is, the amount of signal charge accumulated in the charge accumulation region of each pixel reflects the intensity of the light emitted from the light source 220 and reflected by the subject. The same applies when the light source 200 is set to be in the on-state selectively during part of the exposure period.

For example, at night, by turning on the light sources 200 and 220 during at least part of the exposure period as shown in FIG. 13, it is possible to acquire an image based on substantially only infrared light. In the example shown in FIG. 13, the first pixel signal acquired during the period from time t8 to time t14 substantially represents an image based only on the infrared light emitted from the light source 220. The first pixel signal is converted into a digital signal by the A/D conversion circuit 140, and is temporarily stored in the second frame memory 174 in the form of a digital signal corresponding to the first pixel signal.

The image processing circuit 170 calculates the first difference which is a difference between a digital signal corresponding to the second pixel signal in the (k+1)th frame period and a digital signal corresponding to the first pixel signal in the kth frame period temporarily stored in the second frame memory 174. By performing this process of acquiring the first difference, as in the previous examples, one frame of image data is obtained in a form in which the influence of the reset noise is substantially canceled. The first difference in the example shown in FIG. 13 corresponds to the increment of the second pixel signal acquired during the period from time t16 to time t22 from the signal level of first pixel signal. Thus, the first difference substantially represents an image based on only the infrared light emitted from the light source 200.

Also in this state, a digital signal corresponding to the reset signal read out during a period from time t0 and time t6 in FIG. 13 is held in the first frame memory 172. The image processing circuit 170 further calculates the second difference which is different between the digital signal temporarily stored in the second frame memory 174 and a digital signal corresponding to the reset signal temporarily stored in the first frame memory 172. The second difference in the example shown in FIG. 14 substantially represents an image based on only the infrared light emitted from the light source 220.

The image processing circuit 170 calculates the difference between the first difference and the second difference. Here, let it be assumed that there is no significant difference in output between the light source 200 and the light source 220. In this situation, there is a possibility that the second difference is close to 0 even though a relatively large value is obtained as the difference between the second difference and the first difference. One of two possible reasons for an occurrence of such a situation is that a subject irradiated with the infrared light emitted from the light source 220 is located far away from the light source 220. The other one of possible reasons is that most of the infrared light emitted from the light source 220 is absorbed by moisture in the atmosphere.

Here, let it be assumed that a wavelength that is easily absorbed by water is selected as the second wavelength, and a wavelength that is not easily absorbed by water is selected as the first wavelength. If the second difference is close to 0, and the difference between the second difference and the first difference is relatively large, this means that the target irradiated with the infrared light is located not far from the light sources 200 and 220, and that the light with the first wavelength is mostly absorbed by the moisture in the atmosphere. That is, it is possible to determine whether the reduction in the signal level based on the light with the first wavelength is caused by the too large distance to the subject or caused by the large absorption by water. In a case where a distance is measured using light with the first wavelength, when the second difference between the digital signal corresponding to the first pixel signal and the digital signal corresponding to the reset signal has a value close to 0 for a pixel of a plurality of pixels, it is determined that an error has occurred in a pixel value of that pixel, and a correction may be made by extrapolation using the second difference value related to neighboring pixels. Instead of selecting different wavelengths between the light source 220 and the light source 220, an equal wavelength may be selected for both the light source 220 and the light source 220, and a difference may be introduced in other parameters such as the light emission intensity, the irradiation region, and/or the like between the light source 220 and the light source 220.

In a case where it is difficult to remove ambient light as in the case where shooting is performed in the daytime, as in the example described above with reference to FIG. 10, the first pixel signal may be acquired in a state in which the light sources 200 and 220 are set in the off-state during the exposure period of the kth frame period, and the second pixel signal may be acquired in a state in which one of the light source 200 or the light source 200 is set in the on-state during the exposure period of the (k+1)th frame period. In this case, by acquiring the difference between the second difference and the first difference, it is possible to obtain an image substantially similar to an image obtained when shooting is performed only under the light from the light source set to be in the on-state during the exposure period of the (k+1)th frame period.

Note that the pixel signal may be obtained such that the pixel reset operation is not executed between the (k+1)th frame period and the subsequent (k+2)th frame period, and the other one of the light source 200 and the light source 220 is set to be in the on-state selectively during the exposure period of the (k+2)th frame period. Let this pixel signal be referred to as the third pixel signal. By acquiring the difference between the digital signal corresponding to the third pixel signal and the digital signal corresponding to the second pixel signal, it is possible to obtain an image substantially similar to an image obtained when shooting is performed only under the light from the light source set to be in the on-state during the exposure period of the (k+2)th frame period.

As the second light source 220, a general strobe light source having a peak in the visible wavelength range may be used. In this case, first, the second light source 220 may be set to be in the on-state during a part of the exposure period in a prior frame period, and the light source 200 that emits infrared light may be set in the on-state during a part of the exposure period in a subsequent frame period following the prior frame period. Alternatively, the light source 200 may be set to be in the on-state in the prior frame period, and the light source 220 may be set to be in the on-state in the subsequent frame period. However, in the case where the light source 200 that emits infrared light is set to be in the on-state during a part of the exposure period in the prior frame period, a greater amount of signal charge is accumulated in the charge accumulation region of the pixel, and, as a result, the amount of charge that can be further cumulatively accumulated decreases, which may cause the saturation to easily occur. Note that the larger the amount of charge accumulated in the charge accumulation region of the pixel, the greater the increase in the potential of the impurity region 111 (see FIG. 3) is, and thus more likely a dark current is to occur in the impurity region 111. Therefore, as illustrated in FIG. 13, it is generally advantageous to set the light source 200, which emits infrared light, to be in the on-state during part of the exposure period in the subsequent frame period.

Figure 14:
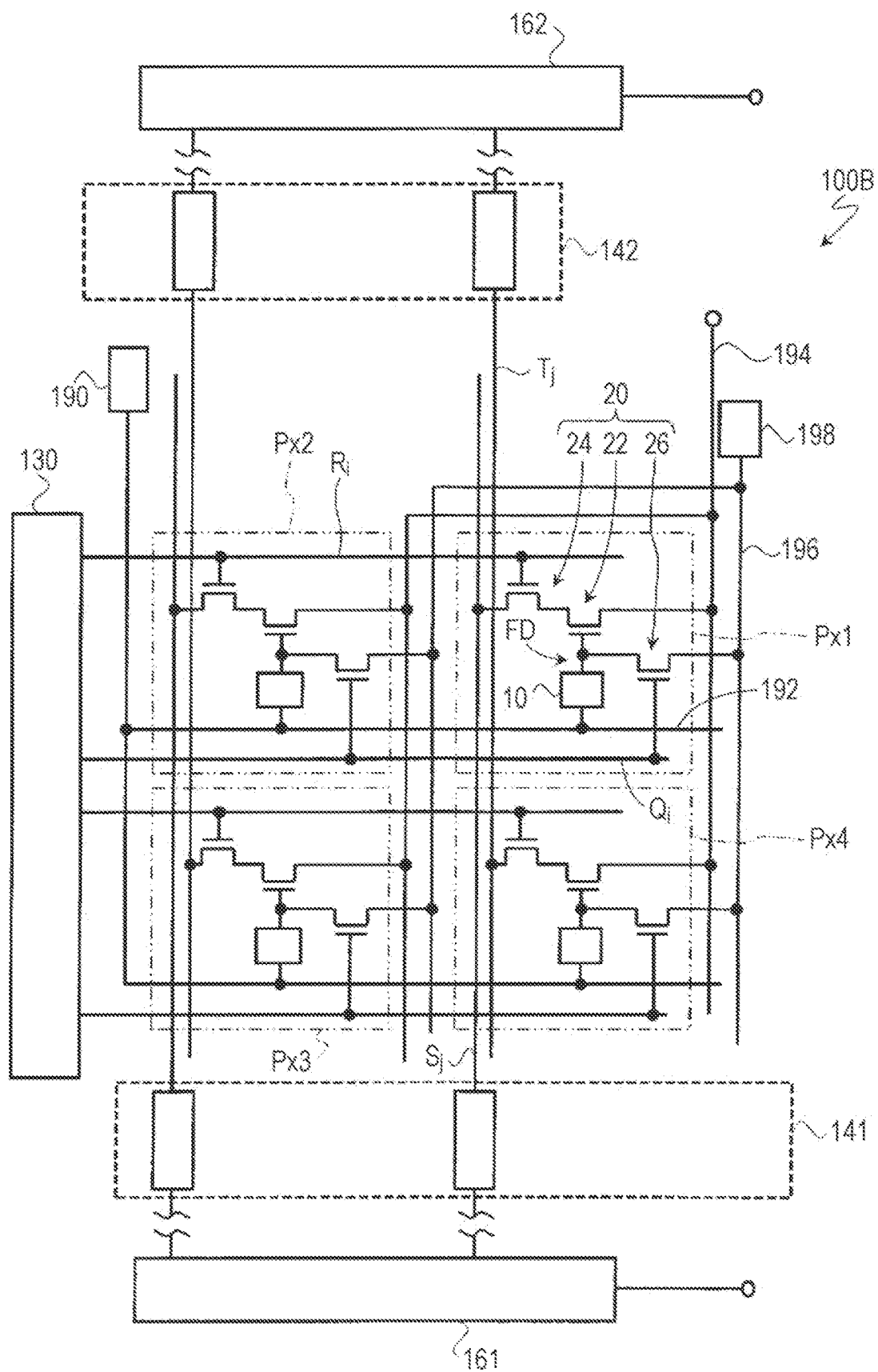
FIG. 14 is a diagram schematically illustrating an example of a circuit configuration of an imaging device according to another embodiment of the present disclosure.

FIG. 14 schematically illustrates an example of a configuration of an imaging device according to still another embodiment of the present disclosure. The imaging device 100B shown in FIG. 14 includes a set of two output signal lines for each column of pixels Px. In the example shown in FIG. 14, for example, in a jth column of pixels Px, an output signal line $S_j$ and an output signal line $T_j$ are provided. Although some components are not shown in FIG. 14 for the sake of simplicity, the imaging device 100B also includes a light source 200 as in the previous examples.

In the present embodiment, one of the two output signal lines provided for each column of pixels Px is connected to, for example, pixels Px in even-numbered rows, and the other one of the two output signal lines is connected to pixels Px in odd-numbered rows. In the example of the configuration illustrated in FIG. 14, the output signal line $S_j$ is connected to the readout circuit 20 of the first pixel Px1 located in the ith row. On the other hand, the output signal line $T_j$ is connected to the readout circuit 20 of the fourth pixel Px4 located in the (i+1)th row.

Furthermore, in this example, the imaging device 100B includes a first A/D conversion circuit 141 and a second A/D conversion circuit wherein the first A/D conversion circuit 141 is electrically connected to pixels in even-numbered rows via one of two output signal lines provided for each column of pixels Px, and the second A/D conversion circuit 141 is electrically connected to pixels in odd-numbered rows via the other one of the two output signal lines. As shown in FIG. 14, the A/D conversion circuit 141 is connected to a first interface 161, and the A/D conversion circuit 142 is connected to a second interface 162. The output of the first interface 161 and the output of the second interface 162 are supplied to an image processing circuit 170 having a first frame memory 172 and a second frame memory 174 (see FIG. 2).

Example of Method of Driving Imaging Device 100B

Figure 15:
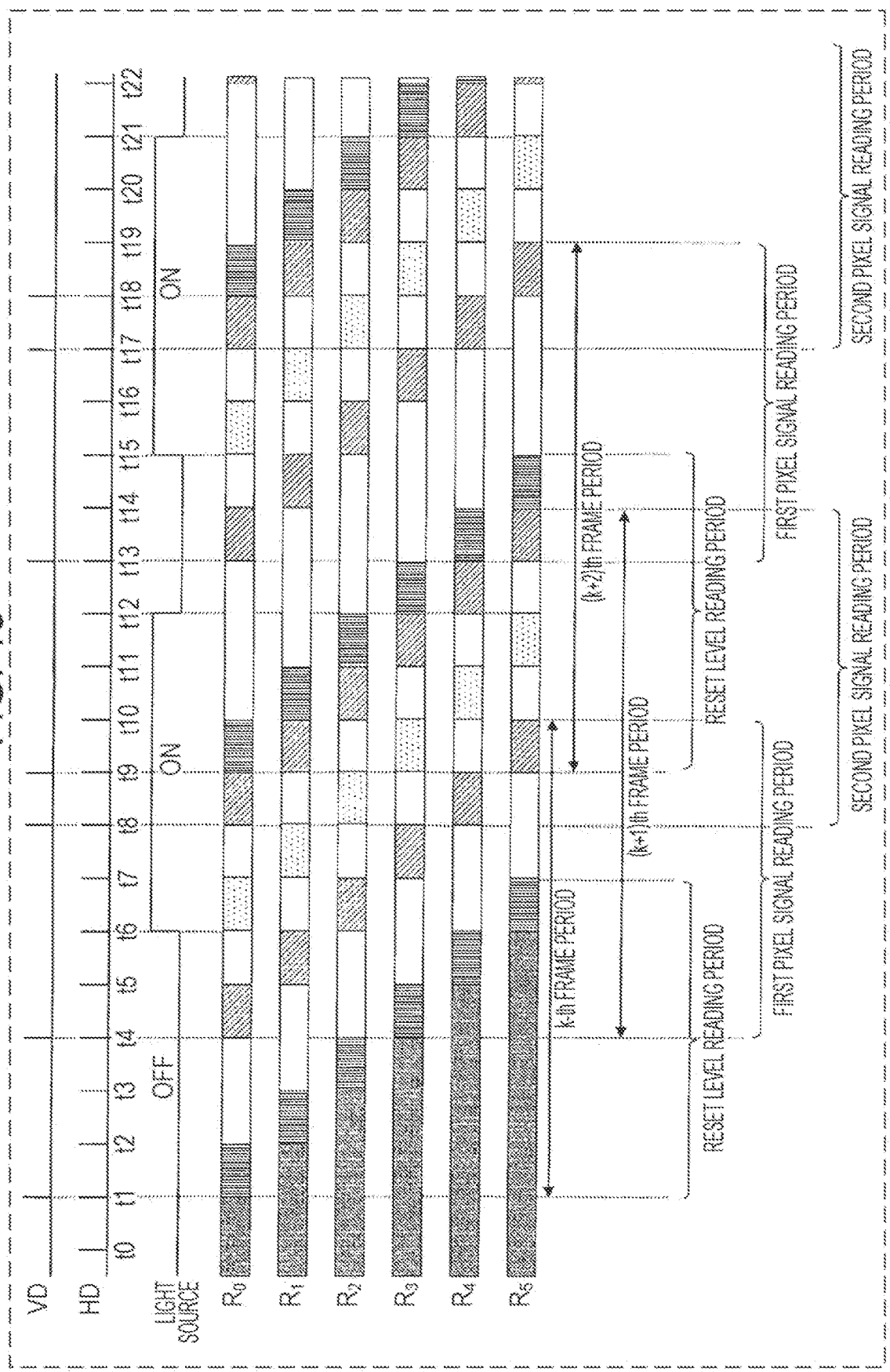
FIG. 15 is a diagram for explaining an example of a method of driving the imaging device shown in FIG. 14.

By providing output signal lines independently for pixels Px in even-numbered rows and pixels in odd-numbered rows, it becomes possible to read signals independently and in parallel from the pixels Px in the even-numbered rows and the pixels Px in the odd-numbered rows. FIG. 15 is a diagram for explaining an example of a method of driving the imaging device 100B shown in FIG. 14.

In this example, the reset signal is read out before the exposure period of the kth frame period. The reading of the reset signal is executed via one of the two output signal lines provided for each column of pixels Px. For example, in a period from time t4 to time t5, reading of the first pixel signal from the pixels in the 0th row $R_0$ is performed in parallel with reading the reset signal of the pixels in the 3rd row $R_3$ vie the output signal line $T_j$. The reading of the first pixel signal is performed via the output signal lines $S_j$.

By employing the configuration in which two output signal lines are provided for each column of pixels Px, it becomes possible to read different signals independently from pixels Px belonging to different rows at a time. In other words, it becomes possible to allow two reading periods for reading different signals to overlap each other. More specifically, in the present example, in the kth frame, the reading period for reading the reset signal is overlapped with the reading period for reading the first pixel signal. Furthermore, in the present example, the reading period for reading the first pixel signal in the kth frame is overlapped with the reading period for reading the second pixel signal in the (k+1)th frame. As described above, by employing the configuration in which two output signal lines are provided for each column of pixels Px, it also becomes possible to overlap signal reading periods between a plurality of frame periods, which allows an increase in the frame rate.

Furthermore, when the frame rate is increased, the exposure time may be reduced thereby reducing the influence of the dark current in the photoelectric conversion layer 12 and/or the influence of the dark current in the impurity region 111. This effect is achieved because the dark current increases in proportion to the exposure time. In particular, in each row of pixels Px, the period in which the light source 200 and/or the light source 220 are in the on-state may be provided as close as possible to the exposure period thereby making it possible to achieve a high SN ratio while suppressing the dark current.

In this example, the light emitted from the light source 200 is scanned over a subject in a period from time t6 to time t12 in a similar manner as in the example described above with reference to FIG. 7. The pixel Px that receives light emitted from the light source 200 and reflected by the subject is transitioned from one row to another row may be transitioned in a similar to the manner in the example shown in FIG. 8.

As described above, according to the embodiment of the present disclosure, the digital signal corresponding to the first analog signal is read out via the readout circuit 20 of each pixel, and stored in the first frame memory 172. The digital signal corresponding to the second analog signal corresponding to the amount of charge accumulated in the pixel during the first exposure period following the reading period for the first analog signal is stored in the second frame memory 174. By calculating the difference between the signals store in the first frame memory 172 and the second frame memory 174, the first difference is obtained which is a signal in which the reset noise is substantially removed. Furthermore, for example, in the second exposure period occurring subsequent to the first exposure period, the light source 200 is set to be in the on-state, and the signal charge is cumulatively accumulated such that the signal charge is added to the signal charge accumulated in the first exposure period. Furthermore, the difference of the digital signal corresponding to the third analog signal corresponding to the amount of charge cumulatively accumulated in the pixel from the digital signal stored in the second frame memory 174 is acquired, and the difference between this difference and the above-described first difference is calculated. As a result, it is possible to obtain image data based on substantially only the light from the light source 200 in a form in which the reset noise is removed.

In the examples of configurations shown in FIGS. 1 and 12, the row scanning circuit 130, the control circuit 250, the A/D conversion circuit 140, the digital memory 150, and the interface 160 are disposed on the semiconductor substrate 110 on which the plurality of pixels Px are formed. That is, the semiconductor substrate 110 on which the plurality of pixels Px are formed, the row scanning circuit 130, the control circuit 250, the A/D conversion circuit 140, the digital memory 150, and the interface 160 may be in the form of a package in which those are integrated. Part or all of these circuits may be integrally formed on the semiconductor substrate 110 in addition to the readout circuits 20 of the respective pixels Px. That is, these circuits may be formed on the semiconductor substrate 110 by applying the same process as the process of forming the readout circuits 20 of the respective pixels Px. For example, the control circuit 250 may be implemented by an integrated circuit formed on the semiconductor substrate 110. However, it is not essential that all of these circuits are integrally formed on the semiconductor substrate 110 together with the pixels Px. Part or all of these circuits may be disposed on a substrate different from the semiconductor substrate 110 on which the pixels Px are formed.

The functions of the control circuit 250 and the functions of the image processing circuit 170 described above may be realized by a combination of a general-purpose processing circuit and software, or may be realized by hardware specialized for such processing. The control circuit 250 may receive a setting related to the exposure time from the image processing circuit 170 according to the result of the processing performed by the image processing circuit 170, and may supply drive signals, according to the setting related to the exposure time, to the row scanning circuit 130, the A/D conversion circuit 140, and the like.

The image processing circuit 170 may be provided in the imaging device in the form of a chip or a package separate from the circuit group formed on the semiconductor substrate 110. The first frame memory 172 and/or the second frame memory 174 may be disposed in the imaging device in the form of a chip or package separate from the image processing circuit 170. Alternatively, the image processing circuits 170 and/or the light source control apparatuses 210 and 230 may be disposed on the semiconductor substrate 110. The image processing circuit 170 may be part of the control circuit 250. The image processing circuit 170 or the control circuit 250 may be configured to execute processing such as a distance measurement calculation, a wavelength information separation process, etc.

The imaging device according to the embodiment of the present disclosure may be provided in the form of a package in which the semiconductor substrate 110 on which the plurality of pixels Px are formed and the image processing circuit 170 are integrated. The imaging device according to the embodiment of the present disclosure may be in the form of an image sensor chip or in the form of a camera.

The embodiments of the present disclosure may be applied to various cameras and camera systems such as a medical camera, a security camera, a camera mounted on a vehicle, a distance measuring camera, a microscope camera, a camera installed on an unmanned aerial vehicle called a drone, and a robot camera, etc. The in-vehicle camera may be used, for example, to input information to a control apparatus for a vehicle to run safely. The in-vehicle camera may be used to assist an operator to drive a vehicle safely.

What is claimed is:

1. An imaging device comprising:
    pixels each of which includes a charge accumulation region and a readout circuit and accumulates charge depending on an amount of exposure;
    a first frame memory;
    a second frame memory;
    an image processing circuit; and
    a first light source that emits infrared light having a peak at a first wavelength,
    wherein the first frame memory temporarily stores a first digital signal corresponding to a first analog signal read out through the readout circuit,
    the second frame memory temporarily stores a second digital signal corresponding to a second analog signal depending on an amount of charge accumulated in each of the pixels during a first exposure period following a reading period in which the first analog signal is read out,
    the image processing circuit outputs a difference between a first difference and a second difference, the first difference being a difference between a third digital signal and the second digital signal, the third digital signal corresponding to a third analog signal corresponding to an amount of charge cumulatively accumulated in each of the pixels during the first exposure period and a second exposure period following the first exposure period, the second difference being a difference between the second digital signal and the first digital signal, and
    at least one of the first exposure period or the second exposure period includes a period in which the first light source is in an on-state.

2. The imaging device according to claim 1, wherein the first analog signal is a reset signal representing a reset level of each of the pixels.

3. The imaging device according to claim 1, wherein the second exposure period includes the period in which the first light source is in the on-state.

4. The imaging device according to claim 3, further comprising a second light source that emits light having a peak at a second wavelength different from the first wavelength,
    wherein the first exposure period includes a period in which the second light source is set to be in the on-state.

5. The imaging device according to claim 1, wherein each of the pixels includes
    a semiconductor substrate on which the readout circuit is disposed, and
    a photoelectric converter that is located above the semiconductor substrate and that is electrically connected to the readout circuit.

* * * * *